US010674454B2

(12) United States Patent
Akkarakaran et al.

(10) Patent No.: US 10,674,454 B2
(45) Date of Patent: Jun. 2, 2020

(54) COMPRESSED MODE WITH DCH ENHANCEMENTS

(71) Applicant: QUALCOMM Incorporated, San Diego, CA (US)

(72) Inventors: Sony Akkarakaran, Poway, CA (US); Peyman Razaghi, San Diego, CA (US); Sharad Deepak Sambhwani, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 511 days.

(21) Appl. No.: 14/602,034

(22) Filed: Jan. 21, 2015

(65) Prior Publication Data

US 2015/0271816 A1 Sep. 24, 2015

Related U.S. Application Data

(60) Provisional application No. 62/020,786, filed on Jul. 3, 2014, provisional application No. 61/991,376, filed
(Continued)

(51) Int. Cl.
*H04W 52/24* (2009.01)
*H04W 52/14* (2009.01)
(Continued)

(52) U.S. Cl.
CPC ......... *H04W 52/241* (2013.01); *H04L 1/1854* (2013.01); *H04L 5/006* (2013.01);
(Continued)

(58) Field of Classification Search
None
See application file for complete search history.

(56) References Cited

U.S. PATENT DOCUMENTS 5,519,730 A * 5/1996 Jasper .................. H04L 5/0048
370/207
5,809,083 A * 9/1998 Wright ................ H04L 27/3455
370/500
(Continued)

FOREIGN PATENT DOCUMENTS

EP 1 758 276 A1 2/2007
EP 2 169 869 A2 3/2010
(Continued)

OTHER PUBLICATIONS

Media Tek Inc., "DPCH Slot Format Optimization Performance Update", 3GPP TSG-RAN WG1 Meeting #73, Fukuoka, Japan, May 20-24, 2013, R1-132269.*
(Continued)

*Primary Examiner* — Joseph A Bednash
(74) *Attorney, Agent, or Firm* — Arent Fox, LLP and Qualcomm, Incorporated

(57) ABSTRACT

The disclosure provides for a compressed mode transmission gap in wireless communications. A user equipment (UE) may receiving a downlink dedicated physical channel (DPCH) having a slot-format and a spreading factor during a first compression interval. The downlink DPCH may not include a compressed-mode transmission gap during the first compression interval. The UE may receive the downlink DPCH having the same slot-format and the same spreading factor during a second compression interval. The UE may determine that the downlink DPCH includes a compressed-mode transmission gap during the second compression interval. A set of slots of the downlink DPCH during the transmission gap may be punctured. The UE may decode the downlink DPCH for the second compression interval based on a set of remaining slots received during the second compression interval. In an aspect, the UE may estimate a
(Continued)

SIR based on a TPC command in a last slot of the transmission gap.

23 Claims, 13 Drawing Sheets

Related U.S. Application Data on May 9, 2014, provisional application No. 61/969,004, filed on Mar. 21, 2014.

(51) Int. Cl.
H04L 1/18 (2006.01)
H04L 5/00 (2006.01)
H04W 72/04 (2009.01)
H04B 1/707 (2011.01)

(52) U.S. Cl.
CPC ......... *H04L 5/0055* (2013.01); *H04W 52/146* (2013.01); *H04W 72/0446* (2013.01); *H04B 1/707* (2013.01)

(56) References Cited

U.S. PATENT DOCUMENTS

| | | | | |
|---|---|---|---|---|
| 6,009,091 | A * | 12/1999 | Stewart | H04W 64/00 370/342 |
| 6,504,863 | B1 * | 1/2003 | Hellmark | H03M 1/129 341/139 |
| 2003/0016740 | A1 * | 1/2003 | Jeske | H04B 3/46 375/227 |
| 2003/0118057 | A1 * | 6/2003 | Ushirokawa | H04W 24/10 370/522 |
| 2004/0106371 | A1 | 6/2004 | Agin | |
| 2004/0120288 | A1 * | 6/2004 | Adjakple | H04L 1/20 370/333 |
| 2007/0021139 | A1 * | 1/2007 | Baker | H04W 52/56 455/522 |
| 2010/0009718 | A1 * | 1/2010 | Higuchi | H04B 7/0837 455/562.1 |
| 2010/0077179 | A1 * | 3/2010 | Stillwell, Jr. | G06F 9/3877 712/30 |
| 2010/0172279 | A1 | 7/2010 | Chen et al. | |

FOREIGN PATENT DOCUMENTS

| | | | | |
|---|---|---|---|---|
| JP | 2008160873 A | | 7/2008 | |
| WO | WO 2006/006895 | * | 1/2006 | ............ H04B 7/005 |
| WO | WO-2006/006895 A1 | | 1/2006 | |

OTHER PUBLICATIONS

Media Tek Inc., "Uplink Compressed mode considerations", 3 GPP TSG RAN WG1 Meeting #76, Prague, Czech Republic, Feb. 10-14, 2014, R1-140253.*
Media Tek. et al. "Uplink Design fro DCH Enhancements", 3GPP TSG-RAN WG1 Meeting #76, Prague, Czech Republic, Feb. 10-14, 2014, R1-140252.*
3GPP TS 25.211 V11.4.0 (Jun. 2013); Technical Specification; 3rd Generation Partnership Project; Technical Specification Group Radio Access Network; Physical channels and mapping of transport channels onto physical channels (FDD); (Release 11).*
3GPP TS 25.212 V11.7.0 (Mar. 2014); Technical Specification; 3rd Generation Partnership Project; Technical Specification Group Radio Access Network; Multiplexing and channel coding (FDD); (Release 11).*
3GPP TS 25.211 V11.4.0 (Jun. 2013); 3rd Generation Partnership Project; Technical Specification Group Radio Access Network; Physical channels and mapping of transport channels onto physical channels (FDD), pp. 10-11, 22-25 (Year: 2013).*
International Search Report and Written Opinion—PCT/US2015/012419—ISA/EPO—dated Apr. 9, 2015, (13 pages).
3GPP TR 25.702: "3rd Generation Partnership Project, Study on Dedicated Channel (DCH) Enhancements for UMTS (Release 12)", 3GPP TR 25.702, V1.0.1 (Aug. 2013), Aug. 2013, pp. 1-2, 186-189.
Qualcomm Incorporated: "Compressed Mode Aspects of DCH Enhancements", 3GPP TSG-RAN WG1#76b, R1-141702, Apr. 4, 2014, pp. 1-6, Internet URL: http://www.3gpp.org/ftp/tsg_ran/WG1_RL1/TSGR1_76b/Docs/R1-141702.zip.

* cited by examiner

COMPRESSED MODE WITH DCH ENHANCEMENTS

CROSS-REFERENCE TO RELATED APPLICATIONS

This application claims priority to U.S. Provisional Application Ser. No. 61/969,004 entitled "DCH ENHANCEMENTS IN COMPRESSED MODE," filed Mar. 21, 2014, U.S. Provisional Application Ser. No. 61/991,376 entitled "DL DCH IN COMPRESSED MODE WITHOUT SPREADING FACTOR REDUCTION," filed May 9, 2014, and U.S. Provisional Application Ser. No. 62/020,786 entitled "COMPRESSED MODE IN BASIC CONFIGURATION OF DCH ENHANCEMENTS WITHOUT SPREADING FACTOR REDUCTION," filed Jul. 3, 2014, each of which is assigned to the assignee hereof and expressly incorporated by reference herein in its entirety.

BACKGROUND

Field

Aspects of the present disclosure relate generally to wireless communication systems, and more particularly, to physical layer configuration of wireless communications.

Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSPA), which provides higher data transfer speeds and capacity to associated UMTS networks.

As the demand for mobile broadband access continues to increase, research and development continue to advance the UMTS technologies not only to meet the growing demand for mobile broadband access, but to advance and enhance the user experience with mobile communications.

Release-99 is a standard that defined dedicated channels between a user equipment (UE) and a base station or node B based on orthogonal variable spreading factor (OVSF) codes. Some wireless networks continue to rely on Release-99 channels for various services. For example, a voice call may be carried over a Release-99 dedicated channel (DCH). Release-99 channels allow for a compressed mode (CM) operation to allow a UE to perform measurements on another frequency or another radio access technology (RAT). The Release-99 CM operation may reduce a spreading factor for a DCH. Such spreading factor reduction may present difficulties for network management of a code tree or may result in additional interference when non-orthogonal codes are used. In view of the foregoing, it may be understood that alternative methods of compressed mode operation are desirable.

SUMMARY

The disclosure provides for a compressed mode transmission gap in wireless communications. A user equipment (UE) may receiving a downlink dedicated physical channel (DPCH) having a slot-format and a spreading factor during a first compression interval. The downlink DPCH may not include a compressed-mode transmission gap during the first compression interval. The UE may receive the downlink DPCH having the same slot-format and the same spreading factor during a second compression interval. The UE may determine that the downlink DPCH includes a compressed-mode transmission gap during the second compression interval. A set of slots of the downlink DPCH during the transmission gap may be punctured. The UE may decode the downlink DPCH for the second compression interval based on a set of remaining slots received during the second compression interval. In an aspect, the UE may estimate a SIR based on a TPC command in a last slot of the transmission gap.

In one aspect, the disclosure provides a method of providing a compressed mode transmission gap in wireless communications. The method may include receiving a downlink dedicated physical channel DPCH having a slot-format and a spreading factor during a first compression interval, wherein the downlink DPCH does not include a compressed-mode transmission gap during the first compression interval. The method may further include receiving the downlink DPCH having the same slot-format and the same spreading factor during a second compression interval. The method may also include determining that the downlink DPCH includes a compressed-mode transmission gap during the second compression interval, wherein a set of slots of the downlink DPCH during the transmission gap are punctured. The method may additionally include decoding the downlink DPCH for the second compression interval based on a set of remaining slots received during the second compression interval.

In another aspect, the disclosure includes an apparatus for providing a compressed mode transmission gap in wireless communications. The apparatus may include a receiver configured to receive a downlink dedicated physical channel (DPCH) having a slot-format and a spreading factor during a first compression interval, wherein the downlink DPCH does not include a compressed-mode transmission gap during the first compression interval, and receive the downlink DPCH having the same slot-format and the same spreading factor during a second compression interval. The apparatus may further include a transmit gap component configured to determine that the downlink DPCH includes a compressed-mode transmission gap during the second compression interval, wherein a set of slots of the downlink DPCH during the transmission gap are punctured. The apparatus may also include a decoder configured to decode the downlink DPCH for the second compression interval based on a set of remaining slots received during the second compression interval.

In another aspect, the disclose includes another apparatus for providing a compressed mode transmission gap in wireless communications. The apparatus may include means for receiving a downlink DPCH having a slot-format and a spreading factor during a first compression interval, wherein the downlink DPCH does not include a compressed-mode transmission gap during the first compression interval. The apparatus may further include means for receiving the downlink DPCH having the same slot-format and the same spreading factor during a second compression interval. The apparatus may also include means for determining that the downlink DPCH includes a compressed-mode transmission gap during the second compression interval, wherein a set of slots of the downlink DPCH during the transmission gap are punctured. The apparatus may additionally include means for decoding the downlink DPCH for the second compression interval based on a set of remaining slots received during the second compression interval.

Another aspect of the disclosure provides a computer-readable medium storing computer executable code. The a computer-readable medium may include code for receiving a downlink DPCH having a slot-format and a spreading factor during a first compression interval, wherein the downlink DPCH does not include a compressed-mode transmission gap during the first compression interval. The computer-readable medium may also include code for receiving the downlink DPCH having the same slot-format and the same spreading factor during a second compression interval. The computer-readable medium may further include code for determining that the downlink DPCH includes a compressed-mode transmission gap during the second compression interval, wherein a set of slots of the downlink DPCH during the transmission gap are punctured. The computer-readable medium may additionally include code for decoding the downlink DPCH for the second compression interval based on a set of remaining slots received during the second compression interval. The computer-readable medium may be a non-transitory computer-readable medium.

These and other aspects of the invention will become more fully understood upon a review of the detailed description, which follows.

DETAILED DESCRIPTION

Figure 1:
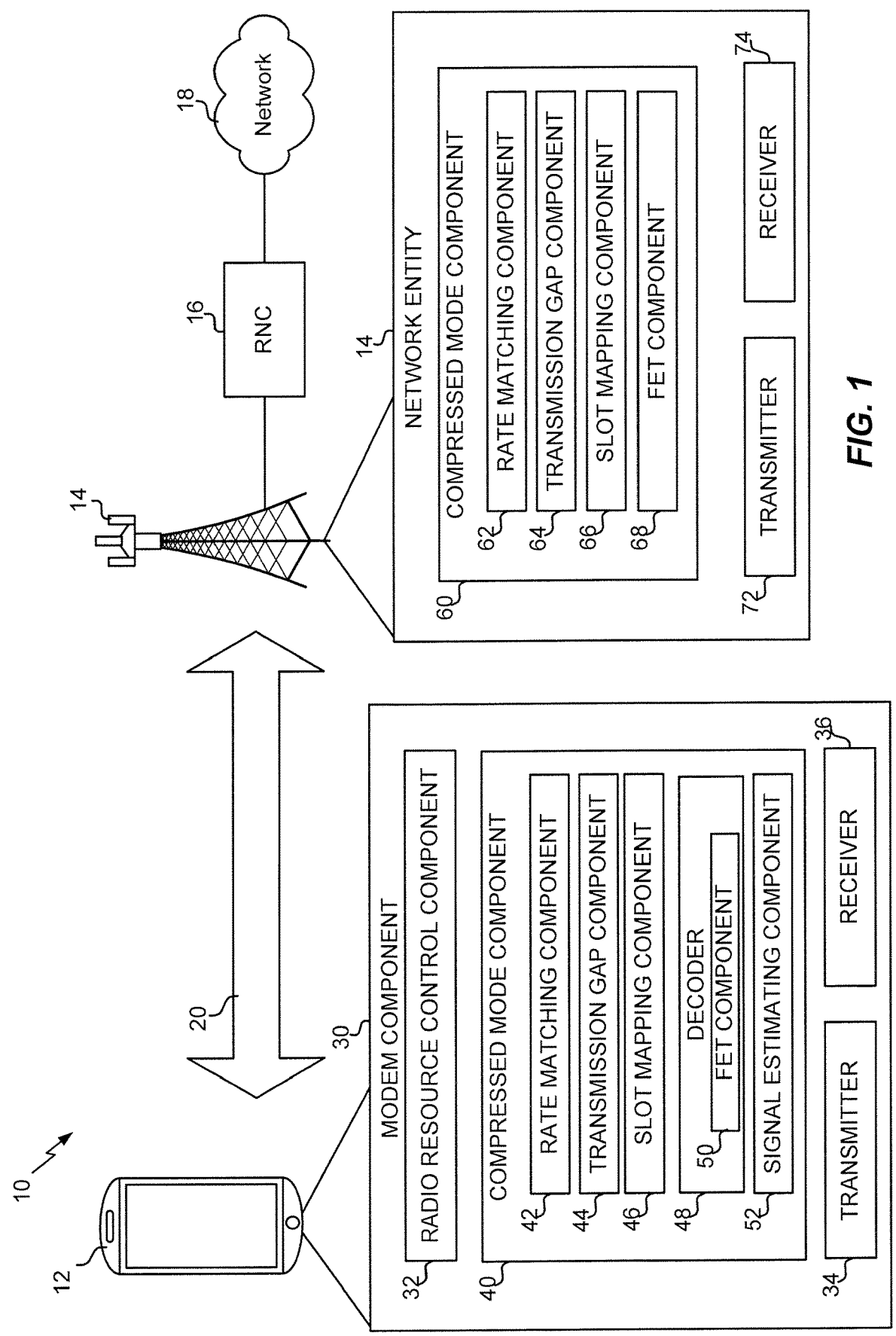
FIG. 1 is a diagram illustrating an example of a UE in communication with a Node B.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

In some wireless networks, Release-99 channels are still used. For example, Release-99 dedicated channels are often used for voice calls due to channel reliability. Generally, a voice call is transmitted as 20 millisecond (ms) voice packets carried over a Release-99 dedicated channel (DCH) having a 20 ms transmit time interval (TTI). Recent enhancements to the Release-99 DCH are designed to conserve resources such as battery life and improve network capacity. Pseudo-flexible rate matching may be used to improve efficiency of physical channel bit allocation by reducing bits for a signaling radio bearer (SRB) sub-flow when no signaling is being transmitted. The transmit power may be increased to compensate for coding rate increases when the SRB is transmitted. The DCH may also be enhanced by creating opportunities to turn off a receiver or transmitter. In the uplink a dedicated physical data channel (DPDCH) may be compressed at the physical layer such that data normally sent over the 20 ms TTI may be sent over a 10 ms TTI, and the transmitter and receiver may be turned off during another 10 ms period. The compression may use a higher peak power, so a UE may switch between a 10 ms TTI mode and 20 ms TTI mode based on transmit power headroom. Transport format combination indicator (TFCI) bits may be transmitted in the uplink to signal the mode and help decode the transmission. In the downlink, frame early detection (FET) may include multiple attempts to decode the downlink DPDCH before the transmission is completed. When early decoding is successful, an acknowledgment (ACK) may be sent on the uplink, and the remaining portion of a TTI may be set to discontinuous transmission (DTX) or discontinuous receive (DRX). The acknowledgement may be transmitted in slots after the TFCI bits have been transmitted.

In an aspect, according to the present disclosure, compressed mode may be configured using the above enhancements to Release-99 DCH. In the downlink, the DPCH may use the same slot format and spreading factor for every compression interval. A compression interval including a transmission gap may have the same slot format and spreading factor as a compression interval with no transmission gap. Discontinuous transmission (DTX) may be used during the transmission gap. The UE may decode the DPCH based on the remaining slots of the DPCH that are transmitted. Further, according to one slot format, a transmit power control (TPC) command may be transmitted at the end of each slot. A TPC command having a fixed value may be transmitted at the end of the last slot of a transmission gap. A UE may use the TPC command having a fixed value to estimate a SIR. In an aspect, compressed mode for the downlink DPCH may be implemented without other DCH enhancements. For example, the downlink DPCH may always use a 20 ms TTI without FET.

In the uplink, a transmission may be mapped to slots excluding slots of the compressed mode transmission gap. The transmission may use slots both before and after the compressed mode transmission gap but not the slots for the compressed mode transmission gap. The TFCI bits may mapped to transmitted slots such that the TFCI bits are transmitted without puncturing. An FET ACK/NAK field may take the place of the TFCI bits in a TTI once all of the TFCI bits have been transmitted Referring to FIG. 1, in an aspect, a wireless communication system 10 includes at least one UE 12 in communication coverage of at least one network entity 14 (e.g., base station or Node B), wherein the UE 12 includes a compressed mode component 40 for providing transmission gaps on a DCH. The network entity 14 may also include a corresponding compressed mode component 60 for providing transmission gaps on the DCH. The UE 12 may communicate with network 18 via network entity 14 and radio network controller (RNC) 16. In some aspects, multiple UEs including UE 12 may be in communication coverage with one or more network entities, including network entity 14. In an example, UE 12 may transmit and/or receive wireless communications to and/or from network entity 14. In an aspect, the RNC 16 may control communication between the UE 12 and one or more network entities 14. For example, the RNC 16 may determine characteristics of the compressed mode to be implemented by the UE 12 and a network entity 14.

In some aspects, UE 12 may also be referred to by those skilled in the art (as well as interchangeably herein) as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, a device for the Internet of Things, or some other suitable terminology. Additionally, network entity 14 may be a macrocell, picocell, femtocell, relay, Node B, mobile Node B, UE (e.g., communicating in peer-to-peer or ad-hoc mode with UE 12), or substantially any type of component that can communicate with UE 12 to provide wireless network access at the UE 12.

In an aspect, the network entity 14 may be a base station such as a Node B in an UTRA network. The network entity 14 may communicate directly with the network 18, or may communicate via the radio network controller (RNC) 16. In an aspect, the network entity 14 and/or the RNC 16 may include a peer compressed mode component 60 for communication with the UE 12. In an example, UE 12 may transmit and/or receive wireless communications 20 to and/ or from network entity 14. Such wireless communications 20 may be, for example, a dedicated channel (DCH) between the UE 12 and a network entity 14. At the physical layer, the DCH may include a dedicated physical channel (DPCH). The DPCH may include a dedicated physical data channel (DPDCH) and/or a dedicated physical control channel (DPCCH).

According to the present aspects, a wireless device such as the UE 12 may include a modem component 30, which may be configured to manage wireless communications 20. In an aspect, the modem component 30 may be operable to handle compressed mode operation using DCH enhancements. In an aspect, the term "component" as used herein may be one of the parts that make up a system, may be hardware, firmware, and/or software that may be executed by the hardware, and may be divided into other components. In an aspect, the modem component 30 may include a radio resource control (RRC) component 32 that controls higher layer signaling between the UE 12 and the RNC 16, a transmitter 34 for transmitting radio signals, a receiver 36 for receiving radio signals, and a compressed mode component 40 for managing physical layer communications.

The RRC component 32 may include hardware or means for implementing a RRC protocol. In an aspect, the RRC component 32 may include or be executable by a processor executing firmware or software for implementing a RRC protocol. The RRC protocol may be described in, for example, 3GPP TS 25.331. In particular, the RRC component 32 may receive signaling for a compressed mode operation. For example, the RRC component 32 may receive a message including a DPCH compressed mode info information element (IE). The DPCH compressed mode IE may include, for example, a transmission gap pattern sequence (TGPS), transmission gap measurement purpose (TGMP), a transmission gap starting slot number (TGSN), one or more transmission gap lengths (TGL), a transmission gap distance (TGD), a transmission gap pattern length (TGPL), power offsets, and/or other information from the network defining compressed mode transmission gaps to be implemented by the UE 12. In an aspect, the compressed mode configuration may be restricted to prevent transmission gaps from causing over-puncturing of DL DPCH. For example, the compressed mode configuration may be restricted to allow no more than 15 slots of transmission gaps in a 40 ms period.

The transmitter 34 may include hardware for transmitting a wireless radio frequency (RF) signal. For example, the transmitter 34 may include transmit chain components such as an antenna, a transmitter, a digital-to-analog converter, and filters. In some instances, the transmitter 34 may include a modulator and/or similar device when, for example, such components are not included in a modem. The transmitter 34 may be tuned to a frequency used by the network entity 14 or another base station.

The receiver 36 may include hardware for receiving a wireless RF signal. For example, the receiver 36 may include receive chain components such as an antenna, analog-to-digital converter, and filters. In some instances, the receiver 36 may include a demodulator and/or similar device when, for example, such components are not included in a modem. The receiver 36 may be independently tuned for receiving signals at a particular frequency or channel. For example, during a transmission gap, the receiver 36 may be tuned to a different frequency to perform measurements.

The compressed mode component 40 may include hardware or means for providing compressed mode transmission gaps on a DCH, as described herein. Further, in an aspect, the compressed mode component 40 may include or be executable by a processor executing firmware or software for providing compressed mode transmission gaps. For example, the compressed mode component 40 may configure an uplink DPCH, based on signaling received by RRC component 32 to include a compressed mode transmission gap using a set of gap slots during a compression interval for an uplink transmission. The compressed mode component 40 may map the uplink transmission to a set of mapped slots in the compression interval, the set of mapped slots excluding the set of gap slots. The compressed mode component 40 may control the transmitter 34 to transmit the uplink transmission during the mapped slots but not during the set of gap slots. In the downlink, the compressed mode component 40 may receive a downlink DPDCH having a slot format and a spreading factor. The downlink DPDCH may use the same slot format and spreading factor for a compression interval including a transmission gap as the slot format and spreading factor for a compression interval without a transmission gap. According to one slot format, the DPDCH may include no pilot signal and a TPC command may be located at the end of a slot. The compressed mode component may determine that a compression interval of the DPDCH is scheduled to include a compressed mode transmission gap. The compressed mode component 40 may estimate a signal to interference ratio (SIR) for the compression interval and compare the SIR to an increased target SIR. Estimating the SIR may be based on the TPC command received in a last slot of the transmission gap having a fixed value. In an aspect, the SIR may include a signal to interference plus noise ratio (SINR) or similar measurement. The compressed mode component 40 may further include a rate matching component 42, a transmission gap component 44, a slot mapping component 46, a decoder 48, and a signal estimating component 52.

The rate matching component 42 may include hardware or means for adjusting a number of data bits assigned to each traffic channel or sub-flow for transmission in an uplink frames. Further, in an aspect, the rate matching component 42 may include or be executable by a processor executing firmware or software for adjusting the number of data bits. In an aspect, the rate matching component 42 may receive one or more transport channels. For example, when using the AMR voice codec, the rate matching component 42 may receive three voice transport channels or sub-flows. The voice transport channels may be concatenated and provided with a cyclic redundancy check (CRC). The rate matching component 42 may also receive a signaling radio bearer (SRB) sub-flow, which may not be present for all frames. The rate matching component 42 may adjust a coding rate such that the bits for the encoded transport channels match a transport block size. For example, the coding may be adjusted so that the number of bits for the encoded transport channels is the same size or smaller than a transport block size. The transport block size may vary based on the presence of a transmission gap within a radio frame. For example, when the radio frame includes a transmission gap, the transport block size may be reduced, so the coding rate may be increased. Because the number of bits for transport channels is not fixed, the rate matching component 42 may be said to perform pseudo-flexible rate matching.

The transmission gap component 44 may include hardware or means for configuring an uplink DPCH to include a compressed mode transmission gap using a set of gap slots during a compression interval for an uplink transmission. Further, in an aspect, the transmission gap component 44 may include or be executable by a processor executing firmware or software for configuring the uplink DPCH. The transmission gap component 44 may receive a CM configuration from higher layers (e.g. RRC component 32). The transmission gap component 44 may determine which slots are to be used for the transmission gap. For example, the transmission gap component 44 may apply a TGPS to a TGSN to determine when transmission gaps start. The transmission gap component 44 may also use a TGL to determine the end of a transmission gap. In an aspect, the CM configuration may be constrained, for example, to allow a maximum of 7 slots per frame to be used for a transmission gap with 14 slots allowed in a 20 ms compression interval. The CM configuration may be further constrained, for example, to allow a maximum of 15 slots in consecutive compression intervals (40 ms) to be used for a transmission gap. Such restrictions on the CM configuration may prevent excessive puncturing of the DPCH such that, for example, voice packets carried on the DPCH may be successfully decoded.

The slot mapping component 46 may include hardware or means for mapping a transmission to a set of mapped slots in a compression interval. Further, in an aspect, the slot mapping component 46 may include or be executable by a processor executing firmware or software for mapping a transmission to a set of mapped slots in a compression interval. In the uplink, the slot mapping component 46 may map the transmission to slots such that the mapped slots exclude any slots used for the transmission gap as configured by the transmission gap component 44. The mapping of the transmission may depend on where the transmission gap is located as well as a transmission TTI. In a 10 ms TTI transmission mode, the transmission may use 15 slots. If a transmission gap overlaps the first frame of the compression interval, a first part of the transmission may be mapped to slots before the transmission gap, and a second part of the transmission may be mapped to slots after the transmission gap. The slots after the transmission gap may be in the first frame and/or the second frame. Generally, a transmission with a 10 ms TTI may be mapped to the first 15 slots of the compression interval excluding any transmission gaps. In a 20 ms TTI mode, the slot mapping component 46 may map slots including a TFCI field to slots excluding the transmission gap. For example, the slots including a TFCI field may be mapped to the first 10 slots excluding the transmission gap. In an aspect, the TFCI field width may vary depending on a configured slot format, so the number of slots including a TFCI field may be the number necessary to transmit all of the TFCI bits (TFCI size/TFCI field width). In the 20 ms TTI mode, DPDCH bits may be mapped to slots in the transmission gap, and may not be transmitted. DCCH bits, including the TFCI bits and ACK/NAK bits; however may be mapped to exclude the transmission gap. The transport block may still be decoded based on the TFCI received in the slots that are transmitted.

For the downlink DPCH, a 20 ms TTI may be used when the compression interval includes a transmission gap regardless of the uplink TTI mode. The downlink DPCH transmission may be mapped to all of the slots in a compression interval including a transmission gap. The slot mapping component 46 may determine a set of punctured slots that occur during the transmission gap. The slot mapping component 46 may also determine a set of remaining slots that are not punctured. When the compression interval includes no transmission gap, either a 10 ms or 20 ms TTI may be used. The TTI may be the same as the uplink TTI mode.

The decoder 48 may include hardware or means for decoding a received signal. Further, in an aspect, the decoder 48 may include or be executable by a processor executing firmware or software for decoding a received signal. The decoder 48 may decode the downlink DPCH. In an aspect, the decoder 48 may further include a frame early termination (FET) component 50. The FET component 50 may include hardware or means for determining whether a downlink transmission has been successfully decoded. For example, the FET component 50 may be implemented with decoder hardware. Further, in an aspect, the FET component 50 may include or be executable by a processor executing firmware or software for determining whether a downlink transmission has been successfully decoded. The FET component 50 may be configured to attempt early decoding of the downlink transmission. In a first aspect, which may be referred to as basic configuration, the downlink transmission may be configured to decode after 10 ms as long as no SRB/DCCH is present, and the receiver 36 may be turned off for the second frame. If the SRB/DCCH is present, the downlink transmission may be received for the entire 20 ms compression interval. Also, when the downlink DPCH includes a CM transmission gap, the downlink transmission may be mapped to the entire 20 ms compression interval. In a second aspect, which may be referred to as full configuration, the early decoding may begin when all of the TFCI bits are received. For example, the TFCI bits may be received in the first 10 slots. The downlink transmission may be decoded and the CRC may be checked to determine success. The FET component 50 may use multiple decoding attempts, for example, every 1 ms or 2 ms until decoding is successful. The FET component 50 may generate an acknowledgement (ACK) or negative acknowledgment (NAK) indicating whether the early decoding has been successful. In compressed mode, the ACK/NAK may use the TFCI field of the uplink DPCH in each slot after the TFCI bits have been transmitted. For example, in a 10 ms TTI mode, the ACK/NAK may begin after the first 15 slots excluding the transmission gap. As another example, in the 20 ms TTI mode, the slots in a transmission gap may be punctured, but the downlink DPCH may still be decoded early based on the remaining slots. The network entity 14 may stop transmitting the downlink DPCH when an ACK indication has been received. Accordingly, the downlink DPCH is not necessarily transmitted for the entire TTI. In an aspect, the ACK/NACK may be paired such that two ACKs may be transmitted to indicate successful decoding and reduce the chances of a false positive ACK being received. The UE 12 may also gate the uplink DPCH early when an ACK has been transmitted and there is no transport block on the DPDCH.

The signal estimating component 52 may include hardware or means for estimating a SIR during a transmission gap. Further, in an aspect, the signal estimating component 52 may include or be executable by a processor executing firmware or software for estimating a SIR during a transmission gap. In an aspect, a downlink DPCH may use a pilot-free compressed mode slot format wherein each slot has no pilot signal and a TPC command is located at the end of the slot. In a compressed frame, the last slot of the transmission gap may include a TPC command having a fixed value, for example 0. The receiver 36 may be able to receive the TPC command without significantly reducing the length of the transmission gap. For example, the receiver 36 may receive the TPC command after performing a measurement on another frequency during the transmission gap. The signal estimating component 52 may estimate a SIR based on the fixed value of the TPC command and the received TPC command. The SIR may be used, for example, for downlink outer loop power control based on a SIR target. In an aspect, the SIR target may be increased for TTIs including a transmission gap because the transmission gap may puncture DPCH bits. For example, the SIR target may be increased by 3 decibels (dB) for TTIs including the transmission gap. The SIR target may also be increased by 3 dB for transmission in the 10 ms TTI mode. In an aspect, the signal estimating component 52 may prevent the TPC command having a fixed value for being used for inner loop power control at the UE 12. In another aspect, the TPC command in the last slot of the transmission gap may be a valid TPC command. The signal estimating component 52 may determine whether to use the TPC for uplink transmit power control based on, for example, a slot number or received SRB/DCCH.

The compressed mode component 60, at the network entity 14, may be a peer entity of the compressed mode component 40. The compressed mode component 60 may include hardware or means for implementing, for example, a Node B side compressed mode configuration corresponding to the UE side configuration. In other words, the compressed mode component 60 may be configured to receive an uplink DPCH transmitted by the UE 12 and transmit a downlink DPCH to the UE 12. In an aspect, the network entity 14 may include a rate matching component 62, a transmission gap component 64, a slot mapping component 66, and a FET component 68.

In an aspect, the rate matching component 62 may be similar to the rate matching component 42. The rate matching component 62 may include hardware or means for adjusting a number of data bits assigned to each traffic channel or sub-flow for transmission in one or more downlink frames. The rate matching component 62 may perform pseudo-flexible rate matching on downlink transport channels based, in part, on whether the downlink frames are configured to include a transmission gap. The rate matching component 62 may determine an effective coding rate when a downlink frame or downlink compression interval includes a transmission gap. Further, the rate matching component 62 may adjust the DPCH transmission power based on the presence of a SRB sub-flow carried on a DCCH and/or the effective coding rate. When the SRB is present, the power may be increased by a configurable power offset (PO2'). Further, because DPDCH bits may be punctured and the effective coding rate lowered, as discussed below, the transmit power may also be boosted for compressed mode frames. In an aspect, a power offset may be applied to a field of the DPCH (e.g. dedicated physical data channel (DPDCH) or dedicated physical control channel (DPCCH)) or both fields. For example, the transmit power may be boosted when the effective coding rate exceeds a threshold, for example, 2/3. When in compressed mode without DCCH, the power may be increased by a configurable power offset (PO2cm). For example, the bits in a DPDCH field may be increased by PO2cm. When in compressed mode with DCCH, the power may be increased by a configurable power offset (PO2cm'). For example, the bits in the DPDCH and/or a DPCCH field may be increased by PO2cm'. The power offsets may have a range of −6 decibels (dB) to 6 dB in steps of 0.25 dB. The power offsets may be signaled to the UE at higher layers for use when the DPCH meets the appropriate criteria.

The transmission gap component 64 may be similar to the transmission gap component 44 in the compressed mode component 40. The transmission gap component 64 may include hardware or means for configuring a downlink DPCH to include a compressed mode transmission gap using a set of gap slots during a compression interval for an downlink transmission. Further, the transmission gap component 64 may determine gap slots used in an uplink DPCH transmission.

The slot mapping component 66 may correspond to the slot mapping component 46. The slot mapping component 66 may include hardware or means for mapping an uplink transmission to a set of mapped slots in a compression interval. The slot mapping component 66 may then correctly interpret received DPCH slots transmitted by the UE 12. For example, the slot mapping component 66 may identify TFCI bits received in DPCH slots. In the downlink, the slot mapping component 66 may map the downlink DPCH based on the transmission mode and compressed mode. In a 10 ms TTI mode, the slot mapping component 66 may map the downlink DPCH to the first 15 slots (10 ms) of a compression interval for a normal transmission. In a 20 ms TTI mode, the slot mapping component 66 may map the downlink DPCH to the all 30 slots (20 ms) of a compression interval for a normal transmission. When the compression interval includes a transmission gap, the slot mapping component 66 may map the downlink DPCH to all 30 slots (20 ms) of the compression interval regardless of the TTI mode. Further, because the slot mapping component 66 maps the downlink DPCH to all of the slots, the slots during the transmission gap may be punctured (e.g. not transmitted or transmitted with reduced or zero power).

On the downlink, in a basic configuration, the downlink transmission may be configured to decode after 10 ms as long as no SRB/DCCH is present. In an aspect, the compressed mode configuration may be constrained such that transmission gaps are only scheduled during the second 10 ms frame. If the SRB/DCCH is present or the compression interval includes a transmission gap, the downlink transmission may be transmitted for the entire 20 ms compression interval. An increased transmission power (e.g. increased by 3 dB) may be used to transmit the downlink transmission. The increased transmission power may allow for decoding of the downlink transmission based on a set of remaining slots outside of the transmission gap.

The slot mapping component 66 may use a pilot-free slot format including a data portion and a TPC command at the end of the slot. The slot mapping component 66 may map a special TPC command having a fixed value to the last slot of a transmission gap for the UE 12 to use for outer loop power control. Table 1, below, lists example slot formats. Slot formats 17A and 18A may be pilot-free slot formats that may be used for compressed mode without spreading factor (SF) reduction.

Figure 2:
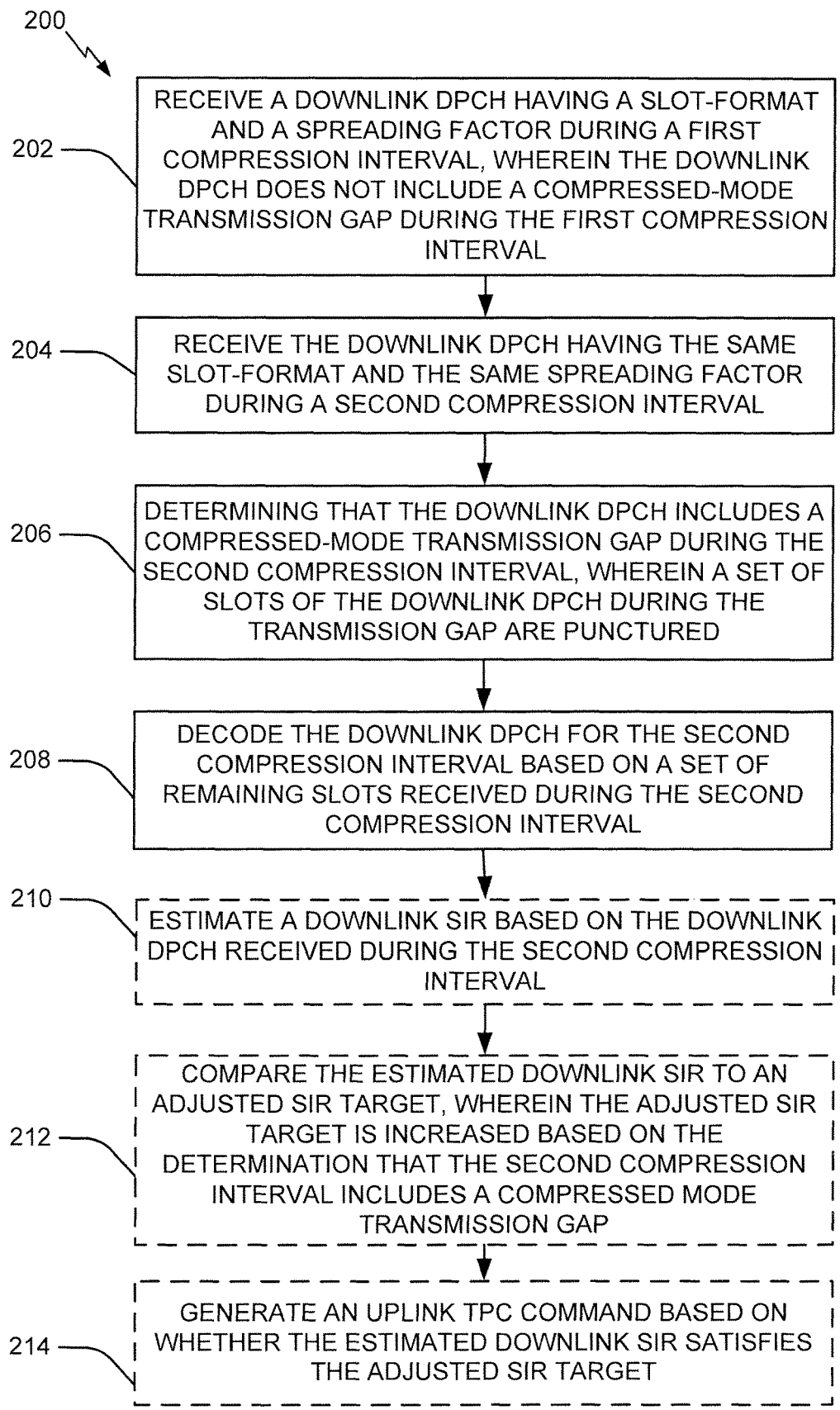
FIG. 2 is a flow diagram illustrating an example of a method for providing a compressed mode transmission gap in wireless communications.

Referring to FIG. 2, in an operational aspect, a UE such as UE 12 (FIG. 1) may perform an aspect of a method 200 of compressed mode operation for wireless communications. While, for purposes of simplicity of explanation, the method is shown and described as a series of acts, it is to be understood and appreciated that the method (and further methods related thereto) is/are not limited by the order of acts, as some acts may, in accordance with one or more aspects, occur in different orders and/or concurrently with other acts from that shown and described herein. For example, it is to be appreciated that a method could alternatively be represented as a series of interrelated states or events, such as in a state diagram. Moreover, not all illustrated acts may be required to implement a method in accordance with one or more features described herein.

In block 202, the method 200 may include receiving a downlink dedicated physical channel (DPCH) having a slot-format and a spreading factor during a first compression interval, wherein the downlink DPCH does not include a compressed-mode transmission gap during the first compression interval. In an aspect, for example, the receiver 36 may receive the downlink DPCH having a slot-format and a spreading factor during a first compression interval. The transmission gap component 44 may indicate that the first compression interval does not include a transmission gap.

In block 204, the method 200 may include receiving the downlink DPCH having the same slot-format and the same spreading factor during a second compression interval. In an aspect, for example, the receiver 36 may receive the downlink DPCH having the same slot-format and the same spreading factor during a second compression interval.

In block 206, the method 200 may include determining that the downlink DPCH includes a compressed-mode transmission gap during the second compression interval, wherein a set of slots of the downlink DPCH during the transmission gap are punctured. In an aspect, for example, the transmission gap component 44 may determine that the

TABLE 1

| Slot Format | Channel Bit Rate | Channel Symbol Rate | SF | Bits/Slot | DPDCH Bits/Slot | | DPCCH Bits/Slot | | Transmitted slots per radio frame |
| --- | --- | --- | --- | --- | --- | --- | --- | --- | --- |
| #i | (kbps) | (ksps) | | | $N_{Data2}$ | $N_{TPC}$ | $N_{TFCI}$ | $N_{Pilot}$ | $N_{Tr}$ |
| 2 | 30 | 15 | 256 | 20 | 2 | 14 | 2 | 0 | 2 | 15 |
| 2A | 30 | 15 | 256 | 20 | 2 | 14 | 2 | 0 | 2 | 8-14 |
| 2B | 60 | 30 | 128 | 40 | 4 | 28 | 4 | 0 | 4 | 8-14 |
| 8 | 60 | 30 | 128 | 40 | 6 | 28 | 2 | 0 | 4 | 15 |
| 8A | 60 | 30 | 128 | 40 | 6 | 28 | 2 | 0 | 4 | 8-14 |
| 8B | 120 | 60 | 64 | 80 | 12 | 56 | 4 | 0 | 8 | 8-14 |
| 17 | 30 | 15 | 256 | 20 | 18 | 0 | 2 | 0 | 0 | 15 |
| 17A | 30 | 15 | 256 | 20 | 18 | 0 | 2 | 0 | 0 | 8-14 |
| 17B | 60 | 30 | 128 | 40 | 36 | 0 | 4 | 0 | 0 | 8-14 |
| 18 | 60 | 30 | 128 | 40 | 38 | 0 | 2 | 0 | 0 | 15 |
| 18A | 60 | 30 | 128 | 40 | 38 | 0 | 2 | 0 | 0 | 8-14 |
| 18B | 120 | 60 | 64 | 80 | 76 | 0 | 4 | 0 | 0 | 8-14 |

The FET component 68 may correspond to the FET component 50 in the compressed mode component 40. The FET component 68 may include hardware or means for determining whether a downlink transmission has been successfully decoded. The FET component 68 may decode the uplink DPCCH to determine whether the UE 12 has transmitted an ACK. In an aspect, the FET component 68 may require paired ACK signals to determine that the downlink transmission has been successfully received. When the FET component 68 detects an ACK, the FET component 68 may DTX the downlink DPCH.

downlink DPCH includes a compressed-mode transmission gap during the second compression interval, wherein a set of slots of the downlink DPCH during the transmission gap are punctured. For example, the transmission gap component 44 may determine the set of slots during the second compression interval that will be punctured to provide the transmission gap. During the transmission gap, the receiver 36 may be tuned to another frequency to, for example, perform measurements. And the receiver 36 may not receive the downlink DPCH during the punctured slots.

In block 208, the method 200 may include decoding the downlink DPCH for the second compression interval based on a set of remaining slots received during the second compression interval. In an aspect, for example, the decoder 48 may decode the downlink DPCH for the second compression interval based on a set of remaining slots received during the second compression interval. In an aspect, for example, the slot mapping component 46 may determine the set of remaining slots based on the transmission gap. The set of remaining slots may include slots that are not punctured, for example, any slot that is not in the transmission gap. In an aspect, the decoder 48 may decode the downlink DPCH based on a subset of the set of remaining slots. For example, the decoder 48 may be able to successfully decode the downlink DPCH early (e.g. before the end of the compression interval) based on a first number of remaining slots that are received. If decoding is unsuccessful, the decoder 48 may attempt decoding using additional remaining slots as the remaining slots are received.

In block 210, the method 200 may optionally include estimating a downlink SIR based on the downlink DPCH received during the second compression interval. In an aspect, for example, the signal estimating component 52 may estimate the downlink SIR based on the downlink DPCH received during the second compression interval. The signal estimating component 52 may obtain measurements of different portions of the received signal to estimate the SIR. In an aspect, where the downlink DPCH uses a pilot free slot format, the SIR estimate may be based on a downlink TPC command having a fixed value. For example, the last slot of a transmission gap may include a TPC command having a fixed value that may be used to accurately estimate the SIR.

In block 212, the method 200 may optionally include comparing the estimated downlink SIR to an adjusted SIR target, wherein the adjusted SIR target is increased based on the determination that the second compression interval includes a compressed mode transmission gap. In an aspect, for example, the signal estimating component 52 may compare the estimated downlink SIR to an adjusted SIR target. In an aspect, the adjusted SIR target or a parameter defining the adjusted SIR target may be provided by the radio resource control component 32.

In block 214, the method 200 may optionally include generating an uplink TPC command based on whether the estimated downlink SIR satisfies the adjusted SIR target. In an aspect, for example, the transmitter 34 may generate the uplink TPC command. The uplink TPC command may be transmitted on an uplink control channel for use by the network entity for controlling the transmit power of the downlink DPCH. For example, when the estimated downlink SIR is less than the adjusted SIR target, the transmitter 34 may generate an UP TPC command to increase the transmit power of the downlink DPCH. When the estimated downlink SIR is greater than the adjusted SIR target, the transmitter 34 may generate a DOWN TPC command to decrease the transmit power of the downlink DPCH.

Figure 3:
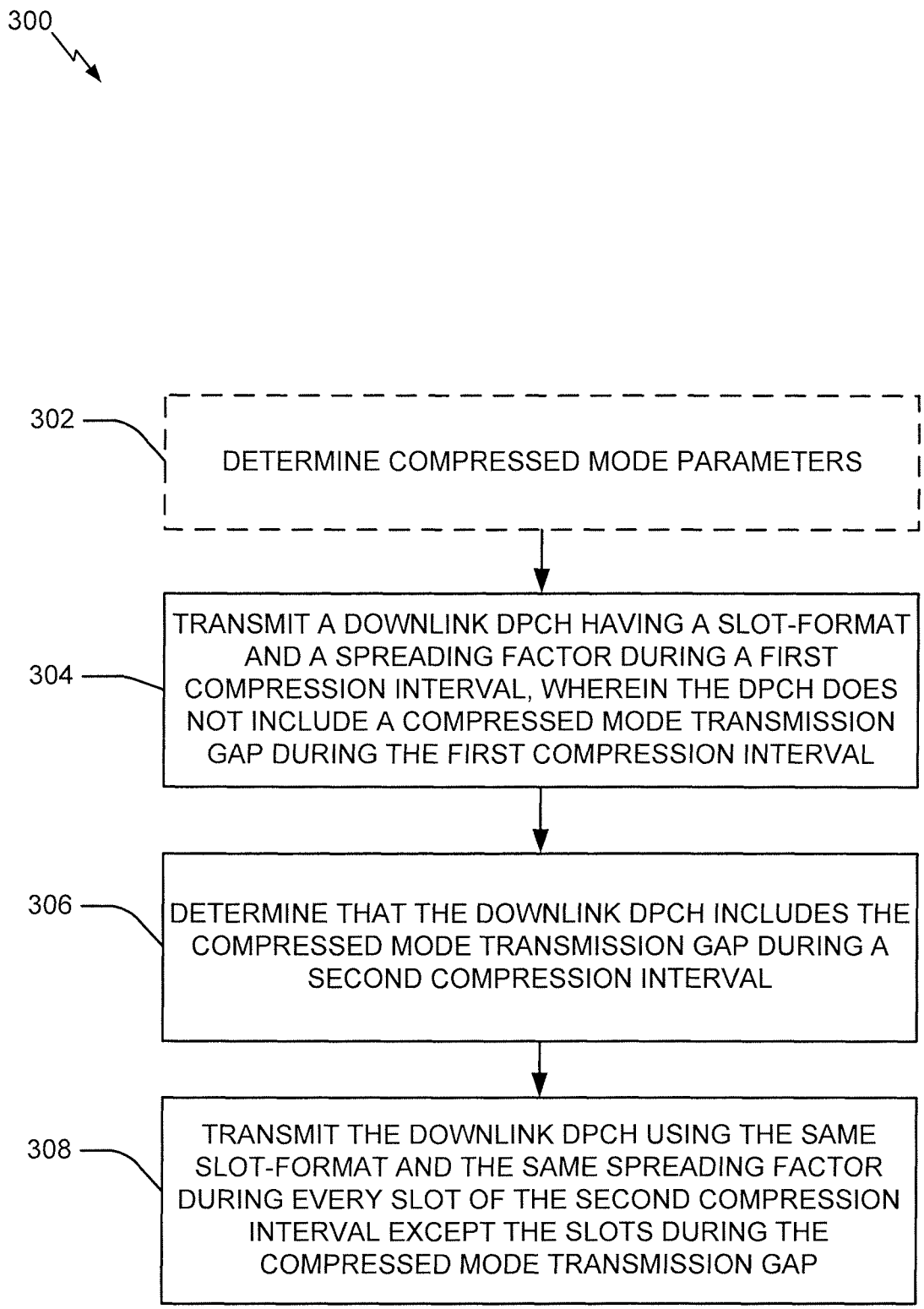
FIG. 3 is a flow diagram illustrating an example of another method for providing a compressed mode transmission gap in wireless communications.

Referring to FIG. 3, in an operational aspect, a network entity such as network entity 14 (FIG. 1) may perform an aspect of a method 300 of providing a compressed mode transmission gap in wireless communications. While, for purposes of simplicity of explanation, the method is shown and described as a series of acts, it is to be understood and appreciated that the method (and further methods related thereto) is/are not limited by the order of acts, as some acts may, in accordance with one or more aspects, occur in different orders and/or concurrently with other acts from that shown and described herein. For example, it is to be appreciated that a method could alternatively be represented as a series of interrelated states or events, such as in a state diagram. Moreover, not all illustrated acts may be required to implement a method in accordance with one or more features described herein.

In block 302, the method 300 may optionally include determining compressed mode parameters. In an aspect, for example, the compressed mode component 60 may determine the compressed mode parameters. In an aspect, the compressed mode parameters may be received from the network 18 or the RNC 16. The compressed mode parameters may be selected to avoid excessive puncturing of the downlink DPCH. For example, the compressed mode parameters may be selected to allow voice packets using known voice codecs to be transmitted with a particular effective coding rate even when a compression interval includes a compressed mode transmission gap. In an aspect, for example, the compressed mode parameters may be selected such that a total number of slots in transmission gaps in two consecutive compression intervals is less than or equal to 15.

In block 304, the method 300 may include transmitting a downlink DPCH having a slot-format and a spreading factor during a first compression interval, wherein the DPCH does not include a compressed mode transmission gap during the first compression interval. In an aspect, for example, the transmitter 72 may transmit the downlink DPCH having a slot-format and a spreading factor during a first compression interval. The slot mapping component 66 may determine the slot format. The transmission gap component 64 may indicate that the compression interval does not include a transmission gap.

In block 306, the method 300 may include determining that the downlink DPCH includes the compressed mode transmission gap during a second compression interval. In an aspect, for example, the transmission gap component 64 may determine that the downlink DPCH includes the compressed mode transmission gap during the second compression interval. For example, the transmission gap component 64 may determine the location of the transmission gap based on the configured compressed mode parameters.

In block 308, the method 300 may include transmitting the downlink DPCH using the same slot-format and the same spreading factor as the first compression interval during every slot of the second compression interval except the slots during the compressed mode transmission gap. In an aspect, for example, the transmitter 72 may transmit the downlink DPCH using the same slot-format and the same spreading factor as the first compression interval during every slot of the second compression interval except the slots during the compressed mode transmission gap. For example, the downlink DPCH may be transmitted using a 20 ms TTI. In an aspect, the transmitting may include puncturing the slots during the transmission gap. For example, the transmitter 72 may stop the transmission, use discontinuous transmission, or transmit the downlink DPCH with reduced or zero power during the transmission gap. In an aspect, the downlink DPCH transmission may be stopped early if the FET component 68 receives a FET ACK on an uplink DPCH. In an aspect, by using the same slot-format and the same spreading factor, the network entity 14 may conserve radio resources such as OVSF codes. In an aspect, the downlink DPCH may be transmitted with a boosted power when the compression interval includes a transmission gap. For example, the transmit power used for the 20 ms TTI including the transmission gap may be the same as a transmit power used for a 10 ms TTI. The transmit power may be further boosted based on the effective coding rate of the downlink DPCH. For example, if the effective coding rate exceeds a threshold (e.g. 2/3), the transmit power may be boosted.

Figure 4:
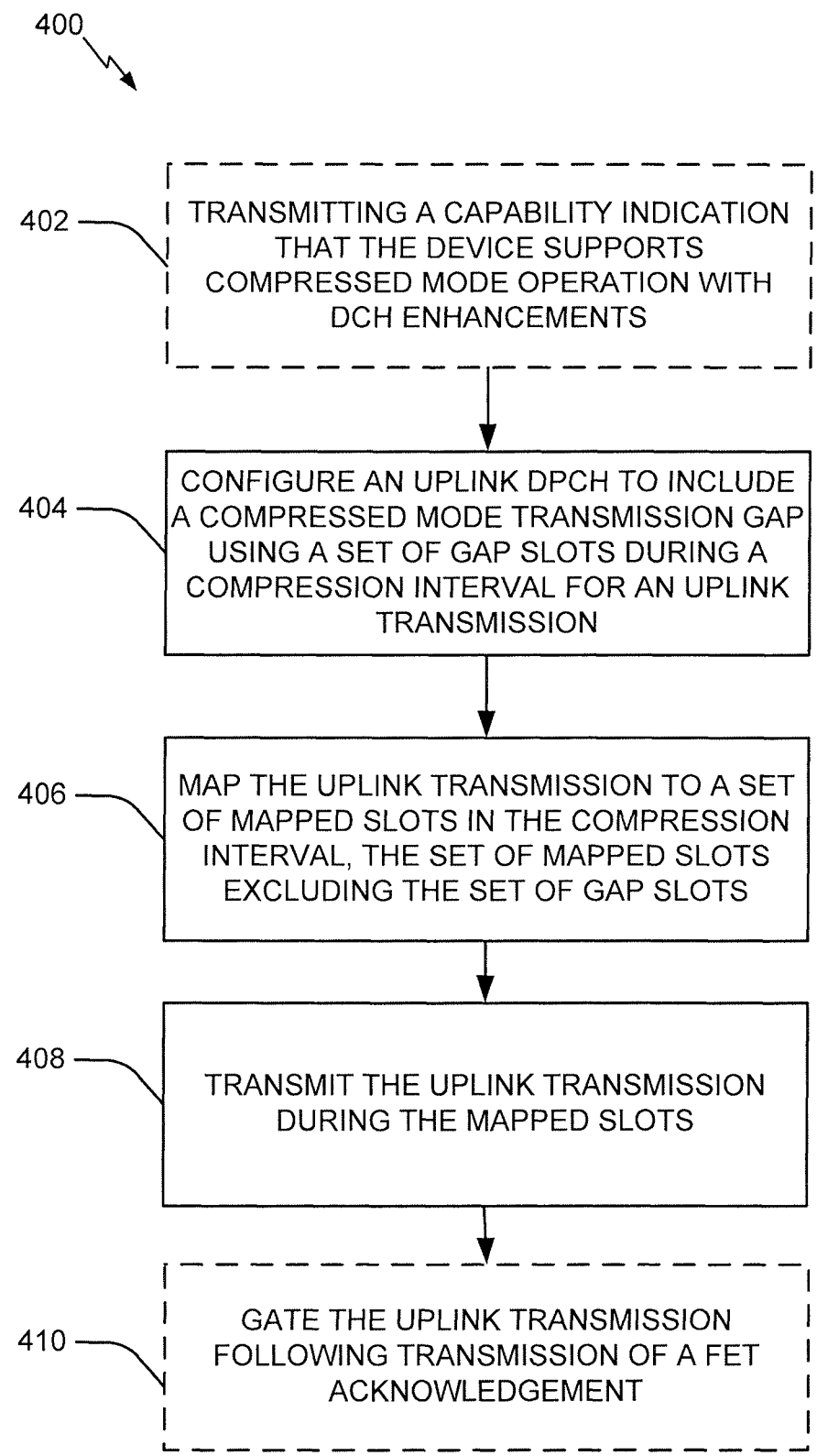
FIG. 4 is a flow diagram illustrating an example of another method for providing a compressed mode transmission gap in wireless communications.

Referring to FIG. 4, in an operational aspect, a UE such as UE 12 (FIG. 1) may perform an aspect of a method 400 of compressed mode operation for wireless communications. While, for purposes of simplicity of explanation, the method is shown and described as a series of acts, it is to be understood and appreciated that the method (and further methods related thereto) is/are not limited by the order of acts, as some acts may, in accordance with one or more aspects, occur in different orders and/or concurrently with other acts from that shown and described herein. For example, it is to be appreciated that a method could alternatively be represented as a series of interrelated states or events, such as in a state diagram. Moreover, not all illustrated acts may be required to implement a method in accordance with one or more features described herein.

In block 402, the method 400 may optionally include transmitting a capability indication that the UE 12 supports compressed mode operation with DCH enhancements. In an aspect, for example, the RRC component 32 may transmit the capability indication that the UE 12 supports compressed mode operation with DCH enhancements via the transmitter 34. For example, the indication may be the value of a bit, flag, or information element in a UE capability information message. The RRC component 32 may determine the capability of the UE 12, for example, based on the presence and configuration of the compressed mode component 40.

In block 404, the method 400 may include configuring an uplink DPCH to include a compressed mode transmission gap using a set of gap slots during a compression interval for an uplink transmission. In an aspect, for example, the transmission gap component 44 (FIG. 1) may configure the uplink DPCH to include a compressed mode transmission gap using a set of gap slots during a compression interval for an uplink transmission. The transmission gap configuration may be based on a compressed mode configuration received from the network 18 by the RRC component 32 (FIG. 1). In an aspect, the compression interval may be a 20 ms interval including a first 10 ms radio frame and a second 10 ms radio frame. Each radio frame may include 15 slots.

In block 406, the method 400 may include mapping the uplink transmission to a set of mapped slots in the compression interval, the set of mapped slots excluding the set of gap slots. In an aspect, for example, the slot mapping component 46 (FIG. 1) may map the uplink transmission to the set of mapped slots in the compression interval. In an aspect, the mapping may include scheduling a first part of the uplink transmission in a first subset of the mapped slots before the set of gap slots and a second part of the uplink transmission in a second subset of the mapped slots after the set of gap slots. In an aspect, a first number of the mapped slots may include a TFCI field. A slot after the first number of slots may include an ACK/NAK field in place of the TFCI field.

In block 408, the method 400 may include transmitting the uplink transmission during the mapped slots but not during the set of gap slots. In an aspect, for example, the transmitter 34 (FIG. 1) may transmit the uplink transmission during the mapped slots but not during the set of gap slots. For example, the transmitter may transmit data mapped to each mapped slot during the mapped slot. The data may include one of the TFCI field or ACK/NAK field. During the gap slots, the transmitter may be turned off or used for other purposes. Any data scheduled for transmission during the gap slots may be blanked or transmitted with zero power.

In block 410, the method 400 may optionally include gating the uplink transmission following transmission of an acknowledgment when there is no transport block for the uplink dedicated physical channel. In an aspect, for example, the FET component 50 (FIG. 1) may gate the uplink transmission following transmission of an acknowledgment when there is no transport block for the uplink dedicated physical channel. For example, the FET component 50 may determine that an ACK has been transmitted and that there is no data to transmit in the uplink, or that the uplink data has been transmitted. The FET component 50 may then turn off the transmitter 34 for a remaining portion of a TTI.

Figure 5:
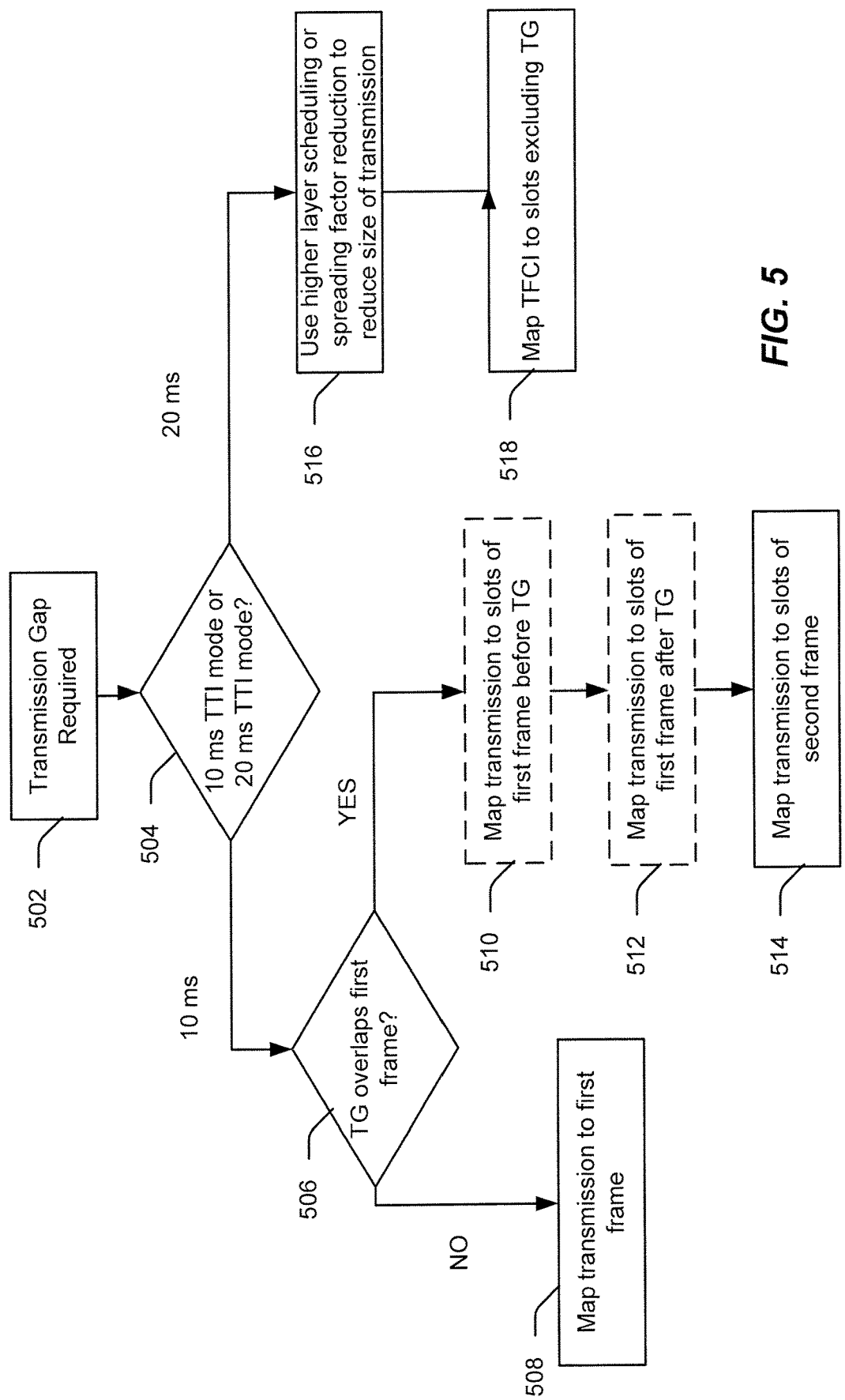
FIG. 5 is a flow diagram illustrating an example of a method of mapping an uplink transmission to slots of a compression interval.

Referring to FIG. 5, in an operational aspect, a UE such as UE 12 (FIG. 1) may perform an aspect of a method 500 of transmission mapping. In an aspect, for example, the method 500 may be performed by the slot mapping component 46. While, for purposes of simplicity of explanation, the method is shown and described as a series of acts, it is to be understood and appreciated that the method (and further methods related thereto) is/are not limited by the order of acts, as some acts may, in accordance with one or more aspects, occur in different orders and/or concurrently with other acts from that shown and described herein. For example, it is to be appreciated that a method could alternatively be represented as a series of interrelated states or events, such as in a state diagram. Moreover, not all illustrated acts may be required to implement a method in accordance with one or more features described herein.

In block 502, the method 500 may include determining that a transmission gap is required during a 20 ms compression interval. For example, the slot mapping component 46 may receive a transmission gap configuration from the transmission gap component 44 indicating which slots are to be used for the transmission gap.

In block 504, the method 500 may include determining whether the UE 12 is operating in a 10 ms TTI mode or a 20 ms TTI mode. The determination may be made at the physical layer based on the uplink power headroom. If the UE 12 is operating in the 10 ms TTI mode, the uplink transmission may include only bits for the for a first radio frame of the 20 ms compression interval. At block 506, the method 500 may include determining whether the transmission gap overlaps the first radio frame. If the transmission gap does not overlap the first radio frame, the method 500 may include, at block 508, mapping the uplink transmission to the first frame. The uplink transmission may be mapped completely to slots before the transmission gap.

If the transmission gap overlaps the first radio frame, a first part of the uplink transmission may be mapped to slots of the first frame and a second part of the uplink transmission may be mapped to slots of the second frame. In block 510, the method 500 may optionally include mapping the uplink transmission to slots of the first frame before the transmission gap. For example, if the transmission gap begins at slot $N_{first}$ and continues to slot $N_{last}$, a first part of the transmission may be mapped to slots 0 to $N_{first}$. In block 512, the method 500 may optionally include mapping a second part of the transmission to slots of the first frame after the transmission gap. If the transmission gap ends before the end of the frame, for example, the second part of the transmission may be mapped to slot $N_{last}+1$ to slot 14. In block 514, the method 500 may include mapping a third part of the transmission to slots of the second frame. For example, the third part may be mapped from slot 0 of the second frame (or slot $N_{last}+1$ if the transmission gap overlaps the second frame) to slot (TGL) of the second frame. In other words, the third part may be mapped to a number of slots equal to the transmission gap length in the second frame.

In block 516, when the 20 ms TTI mode is selected, the method 500 may include using higher layer scheduling to reduce the size of the transmission. The size of the transmission may be limited such that the transmission can be decoded with puncturing of a number of slots equal to the TGL. Spreading factor reduction with a different slot format may also be used to map the transmission to a smaller number of slots. In block 518, the method 500 may include mapping TFCI bits to slots excluding the transmission gap. In an aspect, the blocks 510, 512, and 514 used to map a data transmission to slots excluding the transmission gap may be used to map the TFCI bits to slots excluding the transmission gap.

Figure 6:
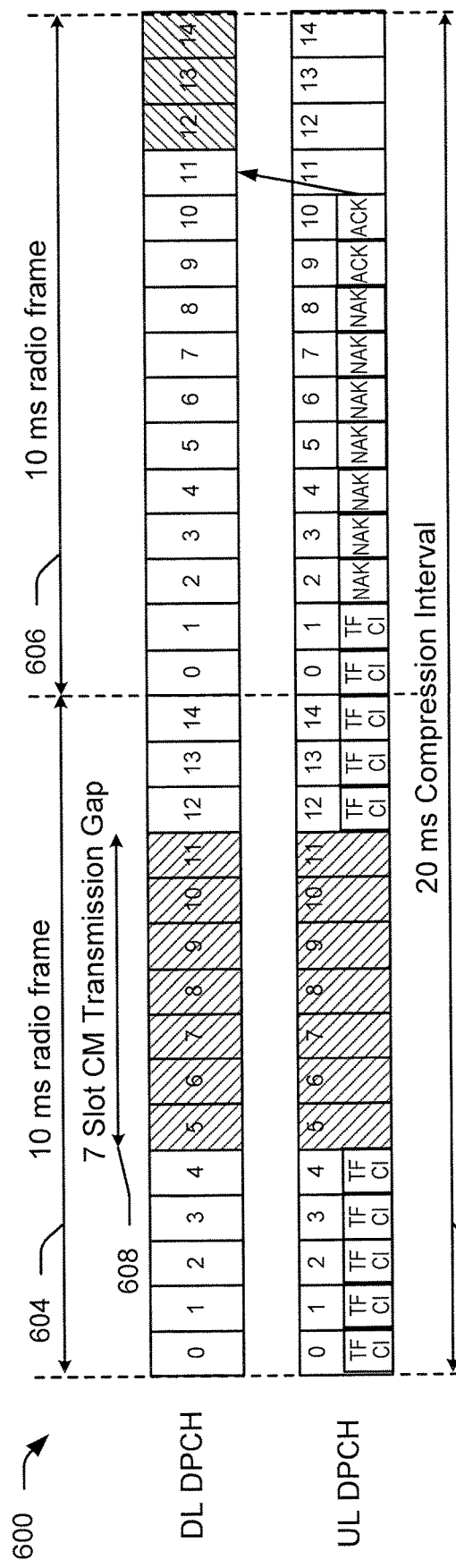
FIG. 6 is a diagram illustrating an example frame structure including a transmission gap.

FIG. 6 illustrates an example of a frame structure 600 having a transmission gap. The frame structure 600 may be a frame structure for a 20 ms compression interval 602 in a 20 ms TTI mode. The compression interval 602 may include a first radio frame 604 and a second radio frame 606. The transmission gap 608 may be 7 slots from slot 5 to slot 11, as illustrated, or a smaller number of slots in a frame. In an aspect, a transmission gap may span two frames, using up to 7 slots in each frame. During the transmission gap 608, both the downlink DPCH and the uplink DPCH may not be transmitted over the air, so any bits assigned to the slots during the transmission gap 608 may be lost. The DL DPCH may be scheduled for transmission over the entire 20 ms compression interval. As illustrated, the bits transmitted in slots 5-11 may be lost. The DL DPCH transmission however, may still be decoded from the remaining slots. The UL DPCH may also be scheduled for transmission over the entire 20 ms compression interval. The dedicated physical control channel (DPCCH), which may include TFCI bits and ACK/NAK bits may be mapped to exclude slots in the transmission gap. For example, the TFCI field may be included in the first 10 slots excluding the transmission gap. In the illustrated example, the TFCI field is transmitted in a first subset of mapped slots (0-4 of the first frame) and a second subset of mapped slots (12-14 of the first frame 604 and slots 0 and 1 of the second frame 606).

In an aspect, FET may be implemented in the frame structure 600. After the TFCI bits are transmitted, the field may be used for the ACK/NAK indication. For example, if the DL DPCH is decoded in slot 8 of the second frame 606, slots 9 and 10 may include an ACK indication. Upon receipt of the ACK indication, the network entity 14 (FIG. 1) may stop transmission of the DL DPCH. Accordingly, for example, frames 12-14 may not be transmitted.

Figure 7:
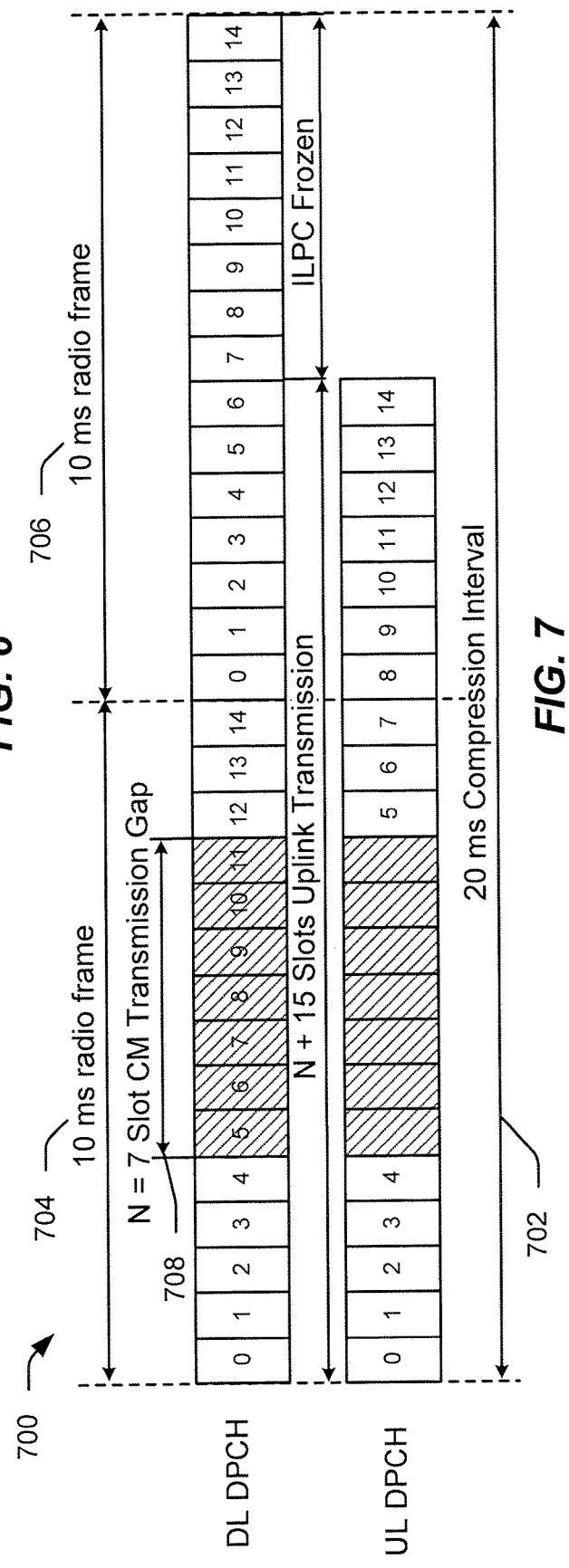
FIG. 7 is a diagram illustrating another example frame structure including a transmission gap.

FIG. 7 illustrates another example of a frame structure 700 having a transmission gap 708. The frame structure 700 may be a frame structure for a 20 ms compression interval 702 in a 10 ms TTI mode. Accordingly, the frame structure 700 may be similar to the frame structure 600 except that the UL DPCH may be scheduled for transmission in 1 radio frame or 15 slots rather than across the entire 20 ms compression interval. During the transmission gap 708 in slots 5-11, for example, of the first frame 704, no uplink transmission may be mapped to the slots in the transmission gap 708. Instead, a first part of the transmission may be mapped to slots 1-4 of the first frame, and a second part of the transmission may be mapped to slots after the transmission gap in the first frame 704 and slots in the second frame 706. The uplink transmission may use a total of N+15, slots where N is the TGL (e.g. 7). In an aspect, the uplink transmission may be gated after the uplink transmission has been completed. Accordingly, because no TPC commands are transmitted, the inner loop power control of the DL DPCH may be frozen for the remainder of the compression interval 702 (e.g. slots 7-14) in the second frame 706. For example, slots 7-14 may be transmitted with the same power as slot 6.

Figure 8:
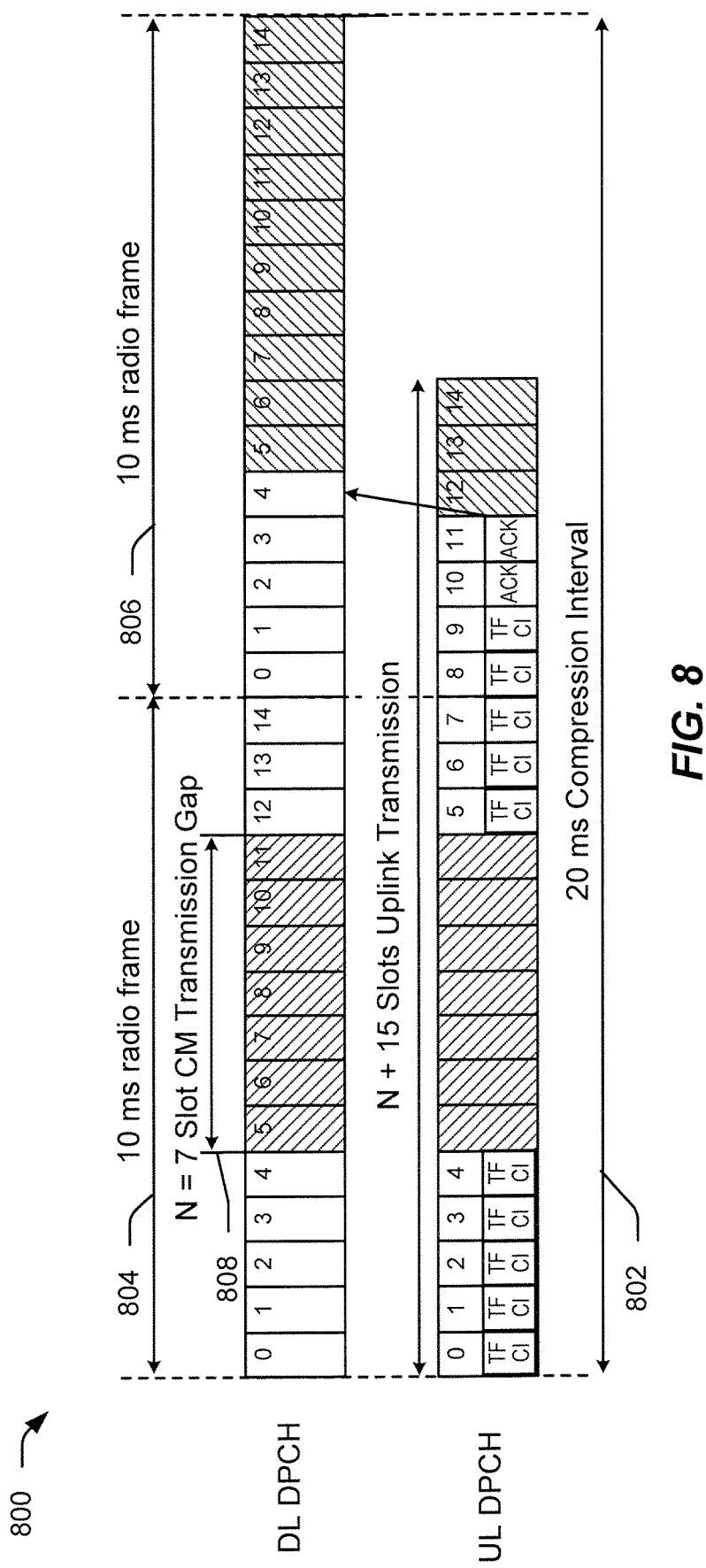
FIG. 8 is a diagram illustrating another frame structure including a transmission gap.

FIG. 8 illustrates a third example of a frame structure 800 having a transmission gap 808. The frame structure 800 may be similar to the frame structure 700. Additionally, the frame structure 800 may provide for FET. In an aspect, the UL DPCH may not have any data and only transmit the DPCCH. The UL DPCCH may include a TFCI field in the first 10 slots of the uplink transmission excluding the transmission gap 808. After the first 10 slots, the UL DPCCH may include an ACK/NAK field instead of the TFCI field. If, for example, the decoder 48 (or FET component 50) decodes the DL DPCH at slot 1 of the second frame 8 and transmits an ACK in slots 2 and 3, the UE 12 may gate the uplink transmission after slot 3. For example, the UE may stop the UL DPCH transmission. The network entity 14 may also receive the ACK and stop the DL DPCH transmission early.

Figure 9:
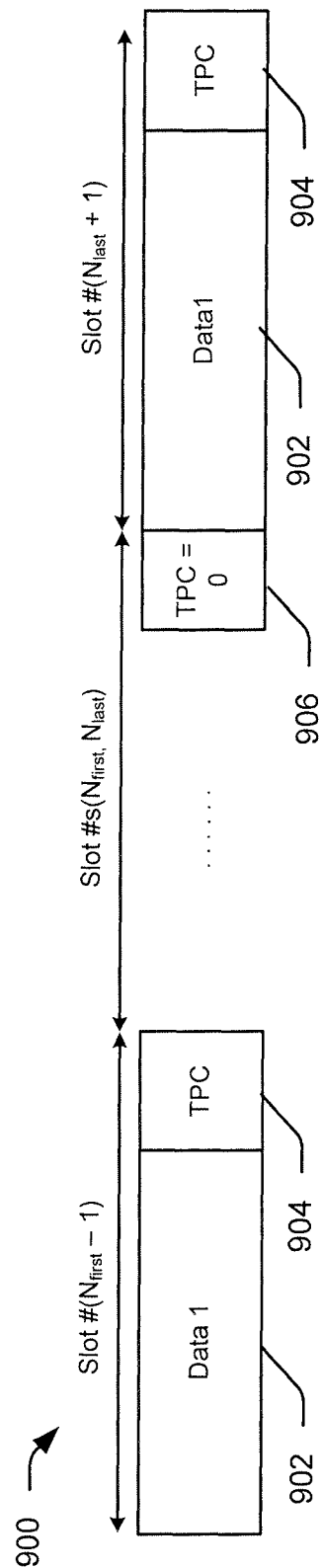
FIG. 9 is a diagram illustrating a downlink pilot free slot format for compressed mode.

FIG. 9 illustrates a slot format 900, which may be used for DL DPCH in compressed mode. A transmission gap may be configured in slots $N_{first}$ to $N_{last}$. The slot format 900 may be a pilot-free slot format. Each transmitted slot may include a data portion 902 and a TPC command 904. The TPC commands 904 may be used for SIR estimates in addition to inner loop power control. Accordingly, a pilot signal within each slot may not be necessary. During the transmission gap, the network entity 14 may not transmit the data portion 902. The slot format 900 may also include a special TPC command 906 within the transmission gap. The special TPC command 906 may have a fixed value. For example, the special TPC command 906 may have a fixed value of 0. The UE 12 may estimate a downlink SIR or SNR based on the special TPC command 906.

Figure 10:
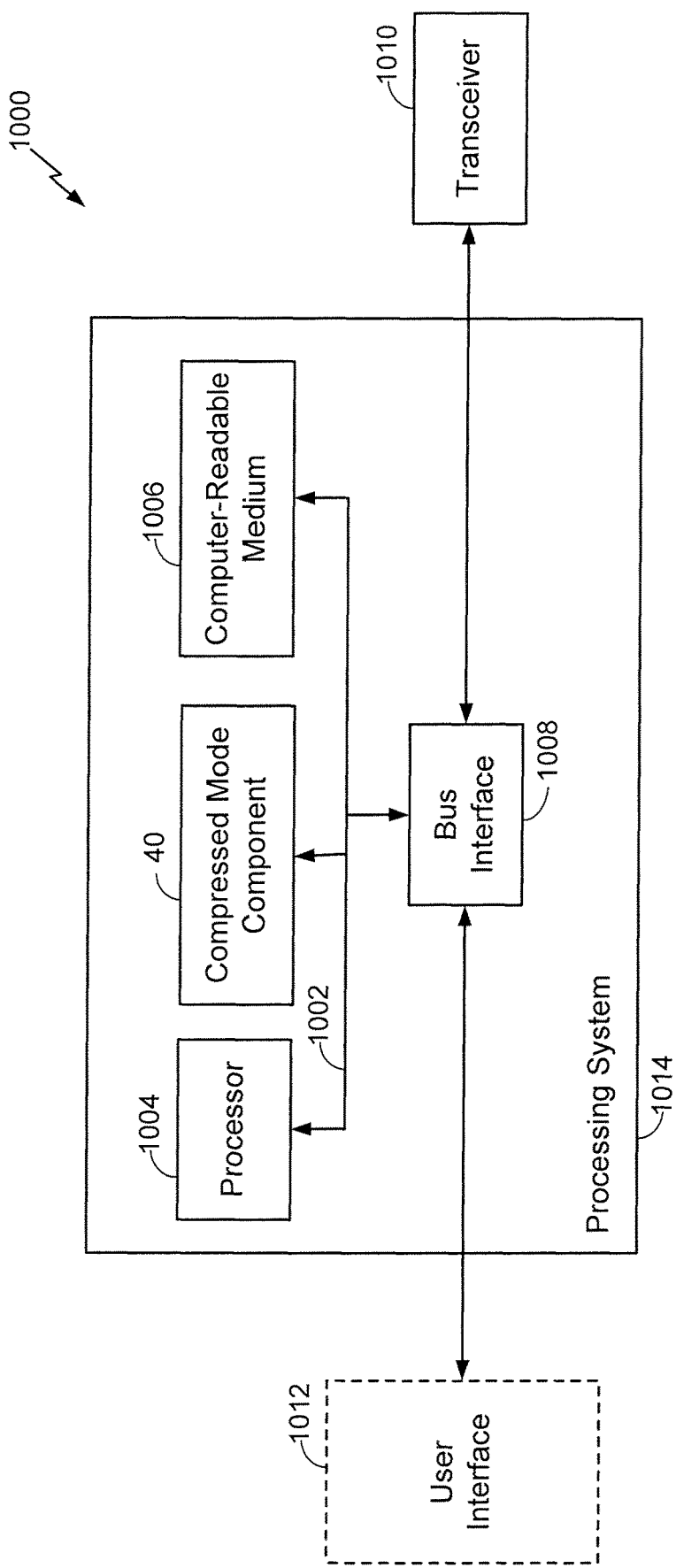
FIG. 10 is a block diagram illustrating an example of a hardware implementation for an apparatus employing a processing system.

FIG. 10 is a block diagram illustrating an example of a hardware implementation for an apparatus 1000 employing a processing system 1014 and including a compressed mode component 40. In this example, the processing system 1014 may be implemented with a bus architecture, represented generally by the bus 1002. The bus 1002 may include any number of interconnecting buses and bridges depending on the specific application of the processing system 1014 and the overall design constraints. The bus 1002 links together various circuits including the compressed mode component 40, one or more processors, represented generally by the processor 1004, and computer-readable media, represented generally by the computer-readable medium 1006. The bus 1002 may also link various other circuits such as timing sources, peripherals, voltage regulators, and power management circuits, which are well known in the art, and therefore, will not be described any further. A bus interface 1008 provides an interface between the bus 1002 and a transceiver 1010. The transceiver 1010 provides a means for communicating with various other apparatus over a transmission medium. Depending upon the nature of the apparatus, a user interface 1012 (e.g., keypad, display, speaker, microphone, joystick) may also be provided.

The processor 1004 is responsible for managing the bus 1002 and general processing, including the execution of software stored on the computer-readable medium 1006. The software, when executed by the processor 1004, causes the processing system 1014 to perform the various functions described infra for any particular apparatus. The computer-readable medium 1006 may also be used for storing data that is manipulated by the processor 1004 when executing software. In an aspect, the compressed mode component 40 may be implemented by the processor 1004, the computer-readable medium 1006, or a combination thereof. For example, the computer-readable medium 1006 may store instruction executable by the processor 1004 for providing compressed mode gaps as described herein.

Figure 11:
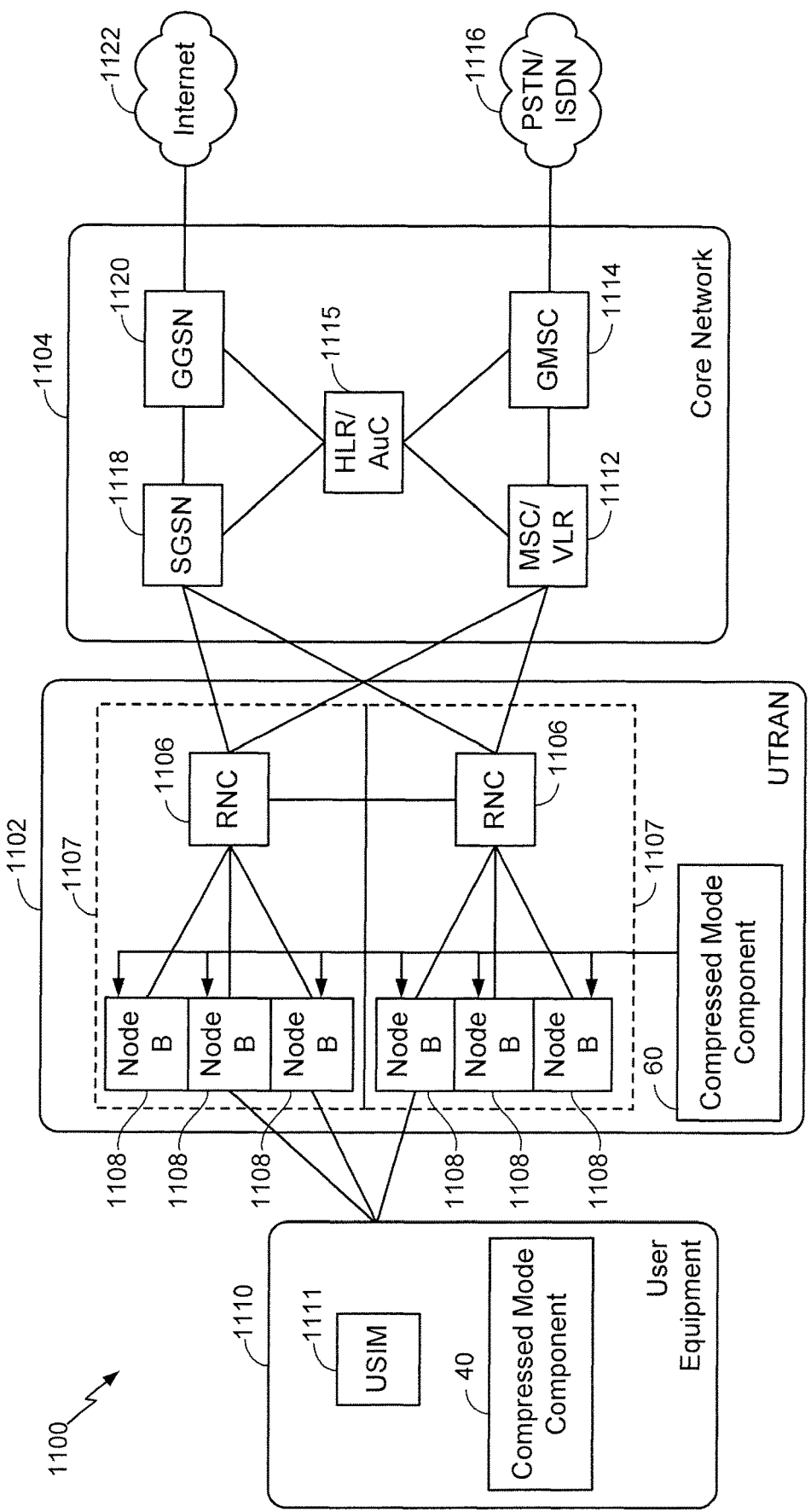
FIG. 11 is a block diagram conceptually illustrating an example of a telecommunications system.

The various concepts presented throughout this disclosure may be implemented across a broad variety of telecommunication systems, network architectures, and communication standards. By way of example and without limitation, the aspects of the present disclosure illustrated in FIG. 11 are presented with reference to a UMTS system 1100 employing a W-CDMA air interface. A UMTS network includes three interacting domains: a Core Network (CN) 1104, a UMTS Terrestrial Radio Access Network (UTRAN) 1102, and User Equipment (UE) 1110. The UE 1110 may be an example of the UE 12 (FIG. 1) and include a compressed mode component 40 for providing compressed mode transmission gaps. In this example, the UTRAN 1102 provides various wireless services including telephony, video, data, messaging, broadcasts, and/or other services. The UTRAN 1102 may include a plurality of Radio Network Subsystems (RNSs) such as an RNS 1107, each controlled by a respective Radio Network Controller (RNC) such as an RNC 1106. Further, the RNS 1107 may include one or more Node Bs 1108, which may each be an example of the Network entity 14 (FIG. 1) and include a compressed mode component 60. Here, the UTRAN 1102 may include any number of RNCs 1106 and RNSs 1107 in addition to the RNCs 1106 and RNSs 1107 illustrated herein. The RNC 1106 is an apparatus responsible for, among other things, assigning, reconfiguring and releasing radio resources within the RNS 1107. The RNC 1106 may be interconnected to other RNCs (not shown) in the UTRAN 1102 through various types of interfaces such as a direct physical connection, a virtual network, or the like, using any suitable transport network.

Communication between a UE 1110 and a Node B 1108 may be considered as including a physical (PHY) layer and a medium access control (MAC) layer. Further, communication between a UE 1110 and an RNC 1106 by way of a respective Node B 1108 may be considered as including a RRC layer. In the instant specification, the PHY layer may be considered layer 1; the MAC layer may be considered layer 2; and the RRC layer may be considered layer 3. The compressed mode component 40 and the compressed mode component 60 may communicate at the PHY layer.

The geographic region covered by the RNS 1107 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 1108 are shown in each RNS 1107; however, the RNSs 1107 may include any number of wireless Node Bs. The Node Bs 1108 provide wireless access points to a CN 1104 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as a UE in UMTS applications, but may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. In a UMTS system, the UE 1110 may further include a universal subscriber identity module (USIM) 1111, which contains a user's subscription information to a network. For illustrative purposes, one UE 1110 is shown in communication with a number of the Node Bs 1108. The DL, also called the forward link, refers to the communication link from a Node B 1108 to a UE 1110, and the UL, also called the reverse link, refers to the communication link from a UE 1110 to a Node B 1108.

The CN 1104 interfaces with one or more access networks, such as the UTRAN 1102. As shown, the CN 1104 is a GSM core network. However, as those skilled in the art will recognize, the various concepts presented throughout this disclosure may be implemented in a RAN, or other suitable access network, to provide UEs with access to types of CNs other than GSM networks.

The CN 1104 includes a circuit-switched (CS) domain and a packet-switched (PS) domain. Some of the circuit-switched elements are a Mobile services Switching Centre (MSC), a Visitor location register (VLR) and a Gateway MSC. Packet-switched elements include a Serving GPRS Support Node (SGSN) and a Gateway GPRS Support Node (GGSN). Some network elements, like EIR, HLR, VLR and AuC may be shared by both of the circuit-switched and packet-switched domains. In the illustrated example, the CN 1104 supports circuit-switched services with a MSC 1112 and a GMSC 1114. In some applications, the GMSC 1114 may be referred to as a media gateway (MGW). One or more RNCs, such as the RNC 1106, may be connected to the MSC 1112. The MSC 1112 is an apparatus that controls call setup, call routing, and UE mobility functions. The MSC 1112 also includes a VLR that contains subscriber-related information for the duration that a UE is in the coverage area of the MSC 1112. The GMSC 1114 provides a gateway through the MSC 1112 for the UE to access a circuit-switched network 1116. The GMSC 1114 includes a home location register (HLR) 1115 containing subscriber data, such as the data reflecting the details of the services to which a particular user has subscribed. The HLR is also associated with an authentication center (AuC) that contains subscriber-specific authentication data. When a call is received for a particular UE, the GMSC 1114 queries the HLR 1115 to determine the UE's location and forwards the call to the particular MSC serving that location.

The CN 1104 also supports packet-data services with a serving GPRS support node (SGSN) 1118 and a gateway GPRS support node (GGSN) 1120. GPRS, which stands for General Packet Radio Service, is designed to provide packet-data services at speeds higher than those available with standard circuit-switched data services. The GGSN 1120 provides a connection for the UTRAN 1102 to a packet-based network 1122. The packet-based network 1122 may be the Internet, a private data network, or some other suitable packet-based network. The primary function of the GGSN 1120 is to provide the UEs 1110 with packet-based network connectivity. Data packets may be transferred between the GGSN 1120 and the UEs 1110 through the SGSN 1118, which performs primarily the same functions in the packet-based domain as the MSC 1112 performs in the circuit-switched domain.

An air interface for UMTS may utilize a spread spectrum Direct-Sequence Code Division Multiple Access (DS-CDMA) system. The spread spectrum DS-CDMA spreads user data through multiplication by a sequence of pseudo-random bits called chips. The "wideband" W-CDMA air interface for UMTS is based on such direct sequence spread spectrum technology and additionally calls for a frequency division duplexing (FDD). FDD uses a different carrier frequency for the UL and DL between a Node B 1108 and a UE 1110. Another air interface for UMTS that utilizes DS-CDMA, and uses time division duplexing (TDD), is the TD-SCDMA air interface. Those skilled in the art will recognize that although various examples described herein may refer to a W-CDMA air interface, the underlying principles may be equally applicable to a TD-SCDMA air interface.

An HSPA air interface includes a series of enhancements to the 3G/W-CDMA air interface, facilitating greater throughput and reduced latency. Among other modifications over prior releases, HSPA utilizes hybrid automatic repeat request (HARQ), shared channel transmission, and adaptive modulation and coding. The standards that define HSPA include HSDPA (high speed downlink packet access) and HSUPA (high speed uplink packet access, also referred to as enhanced uplink, or EUL).

HSDPA utilizes as its transport channel the high-speed downlink shared channel (HS-DSCH). The HS-DSCH is implemented by three physical channels: the high-speed physical downlink shared channel (HS-PDSCH), the high-speed shared control channel (HS-SCCH), and the high-speed dedicated physical control channel (HS-DPCCH).

Among these physical channels, the HS-DPCCH carries the HARQ ACK/NACK signaling on the uplink to indicate whether a corresponding packet transmission was decoded successfully. That is, with respect to the downlink, the UE 1110 provides feedback to the node B 1108 over the HS-DPCCH to indicate whether it correctly decoded a packet on the downlink.

HS-DPCCH further includes feedback signaling from the UE 1110 to assist the node B 1108 in taking the right decision in terms of modulation and coding scheme and precoding weight selection, this feedback signaling including the CQI and PCI.

"HSPA Evolved" or HSPA+ is an evolution of the HSPA standard that includes MIMO and 64-QAM, enabling increased throughput and higher performance. That is, in an aspect of the disclosure, the node B 1108 and/or the UE 1110 may have multiple antennas supporting MIMO technology. The use of MIMO technology enables the node B 1108 to exploit the spatial domain to support spatial multiplexing, beamforming, and transmit diversity.

Multiple Input Multiple Output (MIMO) is a term generally used to refer to multi-antenna technology, that is, multiple transmit antennas (multiple inputs to the channel) and multiple receive antennas (multiple outputs from the channel). MIMO systems generally enhance data transmission performance, enabling diversity gains to reduce multi-path fading and increase transmission quality, and spatial multiplexing gains to increase data throughput.

Spatial multiplexing may be used to transmit different streams of data simultaneously on the same frequency. The data steams may be transmitted to a single UE 1110 to increase the data rate or to multiple UEs 1110 to increase the overall system capacity. This is achieved by spatially pre-coding each data stream and then transmitting each spatially precoded stream through a different transmit antenna on the downlink. The spatially precoded data streams arrive at the UE(s) 1110 with different spatial signatures, which enables each of the UE(s) 1110 to recover the one or more the data streams destined for that UE 1110. On the uplink, each UE 1110 may transmit one or more spatially precoded data streams, which enables the node B 1108 to identify the source of each spatially precoded data stream.

Spatial multiplexing may be used when channel conditions are good. When channel conditions are less favorable, beamforming may be used to focus the transmission energy in one or more directions, or to improve transmission based on characteristics of the channel. This may be achieved by spatially precoding a data stream for transmission through multiple antennas. To achieve good coverage at the edges of the cell, a single stream beamforming transmission may be used in combination with transmit diversity.

Generally, for MIMO systems utilizing n transmit antennas, n transport blocks may be transmitted simultaneously over the same carrier utilizing the same channelization code. Note that the different transport blocks sent over the n transmit antennas may have the same or different modulation and coding schemes from one another.

On the other hand, Single Input Multiple Output (SIMO) generally refers to a system utilizing a single transmit antenna (a single input to the channel) and multiple receive antennas (multiple outputs from the channel). Thus, in a SIMO system, a single transport block is sent over the respective carrier.

Figure 12:
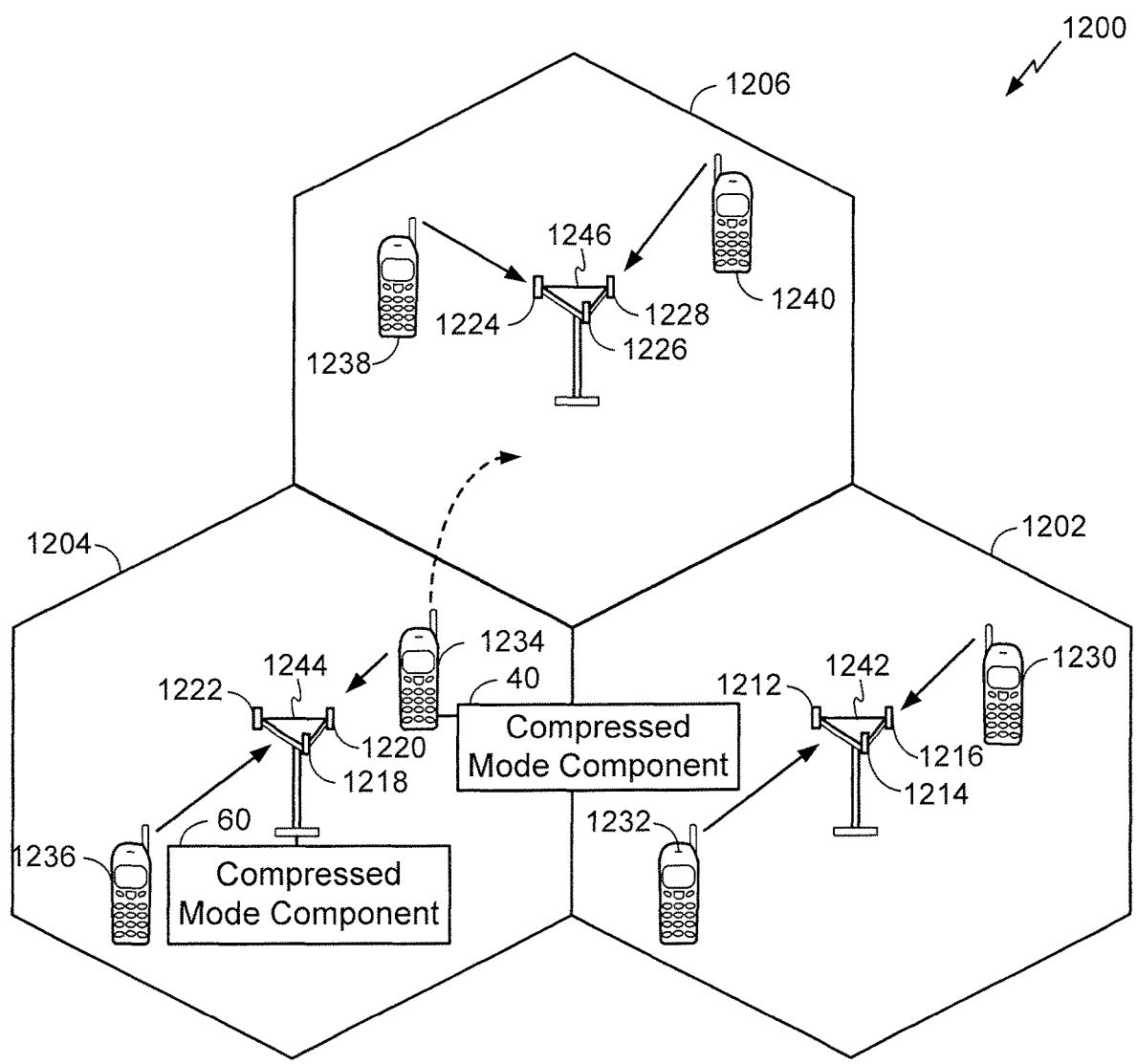
FIG. 12 is a conceptual diagram illustrating an example of an access network.

Referring to FIG. 12, an access network 1200 in a UTRAN architecture is illustrated. The access network 1200 may include a number of UEs 1230, 1232, 1234, 1236, 1238, 1240, each of which may be an example of the UE 12 in FIG. 1 and include a compressed mode component 40. The multiple access wireless communication system includes multiple cellular regions (cells), including cells 1202, 1204, and 1206, each of which may include one or more sectors and be provided by a respective Node B 1242, 1244, 1246, each of which may be an example of the network entity 14 (FIG. 1) and include a compressed mode component 60. The multiple sectors can be formed by groups of antennas with each antenna responsible for communication with UEs in a portion of the cell. For example, in cell 1202, antenna groups 1212, 1214, and 1216 may each correspond to a different sector. In cell 1204, antenna groups 1218, 1220, and 1222 each correspond to a different sector. In cell 1206, antenna groups 1224, 1226, and 1228 each correspond to a different sector. The cells 1202, 1204 and 1206 may include several wireless communication devices, e.g., UEs, which may be in communication with one or more sectors of each cell 1202, 1204 or 1206. For example, UEs 1230 and 1232 may be in communication with Node B 1242, UEs 1234 and 1236 may be in communication with Node B 1244, and UEs 1238 and 1240 can be in communication with Node B 1246. Here, each Node B 1242, 1244, 1246 is configured to provide an access point to a CN 1104 (see FIG. 11) for all the UEs 1230, 1232, 1234, 1236, 1238, 1240 in the respective cells 1202, 1204, and 1206.

As the UE 1234 moves from the illustrated location in cell 1204 into cell 1206, a serving cell change (SCC) or handover may occur in which communication with the UE 1234 transitions from the cell 1204, which may be referred to as the source cell, to cell 1206, which may be referred to as the target cell. Management of the handover procedure may take place at the UE 1234, at the Node Bs corresponding to the respective cells, at a radio network controller 1106 (see FIG.

11), or at another suitable node in the wireless network. For example, during a call with the source cell 1204, or at any other time, the UE 1234 may monitor various parameters of the source cell 1204 as well as various parameters of neighboring cells such as cells 1206 and 1202. Further, depending on the quality of these parameters, the UE 1234 may maintain communication with one or more of the neighboring cells. During this time, the UE 1234 may maintain an Active Set, that is, a list of cells that the UE 1234 is simultaneously connected to (i.e., the UTRA cells that are currently assigning a downlink dedicated physical channel DPCH or fractional downlink dedicated physical channel F-DPCH to the UE 1234 may constitute the Active Set). Each of the cells in the Active Set may include a compressed mode component 60 for providing transmission gaps in the DPCH with the UE 1234.

The modulation and multiple access scheme employed by the access network 1200 may vary depending on the particular telecommunications standard being deployed. By way of example, the standard may include Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. The standard may alternately be Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE, LTE Advanced, and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The radio protocol architecture may take on various forms depending on the particular application. An example for an W-CDMA system will now be presented with reference to FIG. 13.

Figure 13:
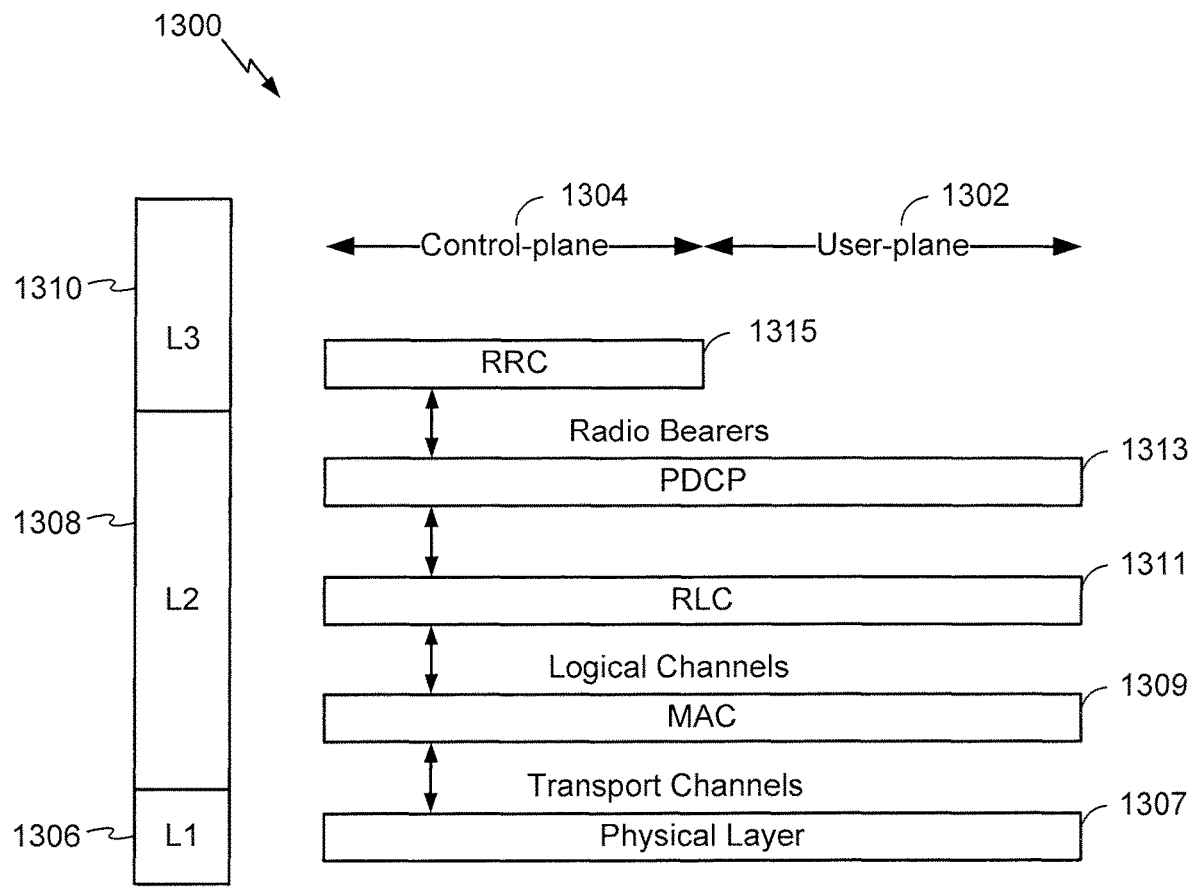
FIG. 13 is a conceptual diagram illustrating an example of a radio protocol architecture for the user and control plane.

Referring to FIG. 13 an example radio protocol architecture 1300 relates to the user plane 1302 and the control plane 1304 of a user equipment (UE) or node B/base station. For example, architecture 1300 may be included in a UE such as the UE 12 (FIG. 1). The radio protocol architecture 1300 for the UE and node B is shown with three layers: Layer 1 1306, Layer 2 1308, and Layer 3 1310. Layer 1 1306 is the lowest lower and implements various physical layer signal processing functions. As such, Layer 1 1306 includes the physical layer 1307. Layer 2 (L2 layer) 1308 is above the physical layer 1307 and is responsible for the link between the UE and node B over the physical layer 1307. Layer 3 (L3 layer) 1310 includes a radio resource control (RRC) sublayer 1315. The RRC sublayer 1315 handles the control plane signaling of Layer 3 between the UE and the UTRAN.

In an aspect, the compressed mode component 40 may be implemented at the physical layer 1307. The compressed mode parameters may be configured by Layer 3 RRC signaling but the other communications discussed herein may occur between the UE 12 and network entity 14 at the physical layer 1307. Accordingly, various aspects of the compressed mode operation may be transparent to higher layers. For example, as discussed above, uplink transmissions may be mapped to slots of two radio frames to exclude the transmission gap. As long as the transmission gaps are available for measurements as configured by the RRC layer, the higher layer may not affected by the physical channel slots mapped. In another aspect, the FET ACK/NACK procedure discussed herein does not change the order of transmissions and may be transparent to higher layers.

In the user plane, the L2 layer 1308 includes a media access control (MAC) sublayer 1309, a radio link control (RLC) sublayer 1311, and a packet data convergence protocol (PDCP) 1313 sublayer, which are terminated at the node B on the network side. Although not shown, the UE may have several upper layers above the L2 layer 1308 including a network layer (e.g., IP layer) that is terminated at a PDN gateway on the network side, and an application layer that is terminated at the other end of the connection (e.g., far end UE, server, etc.).

The PDCP sublayer 1313 provides multiplexing between different radio bearers and logical channels. The PDCP sublayer 1313 also provides header compression for upper layer data packets to reduce radio transmission overhead, security by ciphering the data packets, and handover support for UEs between node Bs. The RLC sublayer 1311 provides segmentation and reassembly of upper layer data packets, retransmission of lost data packets, and reordering of data packets to compensate for out-of-order reception due to hybrid automatic repeat request (HARQ). The MAC sublayer 1309 provides multiplexing between logical and transport channels. The MAC sublayer 1309 is also responsible for allocating the various radio resources (e.g., resource blocks) in one cell among the UEs. The MAC sublayer 1309 is also responsible for HARQ operations.

Figure 14:
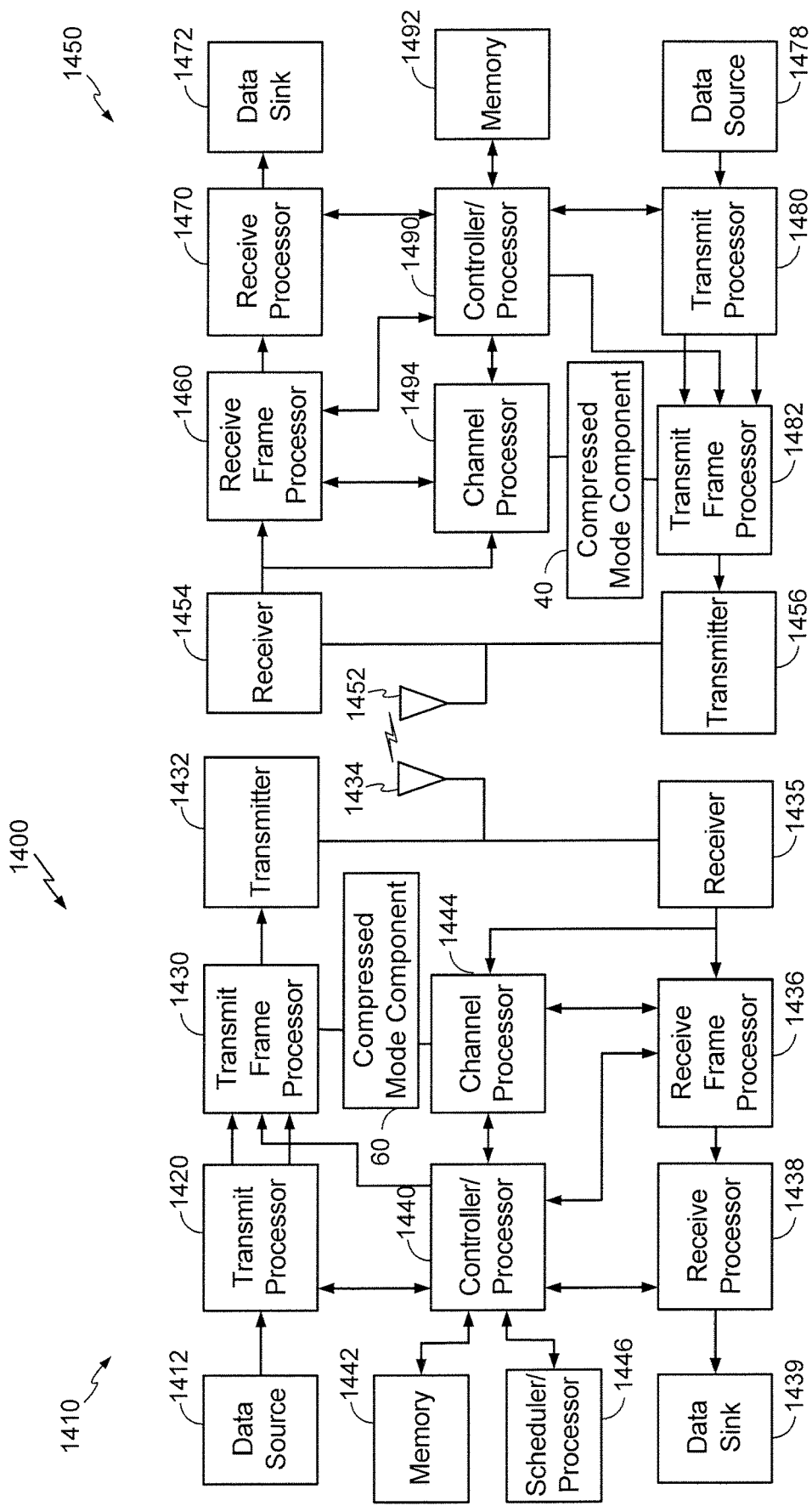
FIG. 14 is a block diagram conceptually illustrating an example of a Node B in communication with a UE in a telecommunications system.

FIG. 14 is a block diagram of a Node B 1410 in communication with a UE 1450, where the Node B 1410 may be the Node B 1308 in FIG. 12, and the UE 1450 may be the UE 1210 in FIG. 12. In the downlink communication, a transmit processor 1420 may receive data from a data source 1412 and control signals from a controller/processor 1440 and/or compressed mode component 60. The transmit processor 1420 provides various signal processing functions for the data and control signals, as well as reference signals (e.g., pilot signals). For example, the transmit processor 1420 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 1444 may be used by a controller/processor 1440 to determine the coding, modulation, spreading, and/or scrambling schemes for the transmit processor 1420. These channel estimates may be derived from a reference signal transmitted by the UE 1450 or from feedback from the UE 1450. The symbols generated by the transmit processor 1420 are provided to a transmit frame processor 1430 to create a frame structure. The transmit frame processor 1430 creates this frame structure by multiplexing the symbols with information from the controller/processor 1440, resulting in a series of frames. In an aspect, the transmit frame processor 1430 may receive slot mapping information from the compressed mode component 60 The frames are then provided to a transmitter 1432, which provides various signal conditioning functions including amplifying, filtering, and modulating the frames onto a carrier for downlink transmission over the wireless medium through antenna 1434. The antenna 1434 may include one or more antennas, for example, including beam steering bidirectional adaptive antenna arrays or other similar beam technologies.

At the UE 1450, a receiver 1454 receives the downlink transmission through an antenna 1452 and processes the transmission to recover the information modulated onto the carrier. The information recovered by the receiver 1454 is provided to a receive frame processor 1460, which parses each frame, and provides information from the frames to a channel processor 1494 and the data, control, and reference signals to a receive processor 1470. The receive processor 1470 then performs the inverse of the processing performed by the transmit processor 1420 in the Node B 1410. More specifically, the receive processor 1470 descrambles and despreads the symbols, and then determines the most likely signal constellation points transmitted by the Node B 1410 based on the modulation scheme. These soft decisions may be based on channel estimates computed by the channel processor 1494. The soft decisions are then decoded and deinterleaved to recover the data, control, and reference signals. The CRC codes are then checked to determine whether the frames were successfully decoded. The data carried by the successfully decoded frames will then be provided to a data sink 1472, which represents applications running in the UE 1450 and/or various user interfaces (e.g., display). Control signals carried by successfully decoded frames will be provided to a controller/processor 1490. When frames are unsuccessfully decoded by the receiver processor 1470, the controller/processor 1490 may also use an acknowledgement (ACK) and/or negative acknowledgement (NACK) protocol to support retransmission requests for those frames. In an aspect, the compressed mode component 40 may control channel processor 1494 to perform multiple early decoding attempts until a transmission is successfully decoded.

In the uplink, data from a data source 1478 and control signals from the controller/processor 1490 are provided to a transmit processor 1480. The data source 1478 may represent applications running in the UE 1450 and various user interfaces (e.g., keyboard). Similar to the functionality described in connection with the downlink transmission by the Node B 1410, the transmit processor 1480 provides various signal processing functions including CRC codes, coding and interleaving to facilitate FEC, mapping to signal constellations, spreading with OVSFs, and scrambling to produce a series of symbols. Channel estimates, derived by the channel processor 1494 from a reference signal transmitted by the Node B 1410 or from feedback contained in the midamble transmitted by the Node B 1410, may be used to select the appropriate coding, modulation, spreading, and/or scrambling schemes. The symbols produced by the transmit processor 1480 will be provided to a transmit frame processor 1482 to create a frame structure. The transmit frame processor 1482 creates this frame structure by multiplexing the symbols with information from the controller/processor 1490, resulting in a series of frames. In an aspect, the compressed mode component may provide slot mapping information to the transmit frame processor 1482 for creating the frame structure. The frames are then provided to a transmitter 1456, which provides various signal conditioning functions including amplification, filtering, and modulating the frames onto a carrier for uplink transmission over the wireless medium through the antenna 1452.

The uplink transmission is processed at the Node B 1410 in a manner similar to that described in connection with the receiver function at the UE 1450. A receiver 1435 receives the uplink transmission through the antenna 1434 and processes the transmission to recover the information modulated onto the carrier. The information recovered by the receiver 1435 is provided to a receive frame processor 1436, which parses each frame, and provides information from the frames to the channel processor 1444 and the data, control, and reference signals to a receive processor 1438. The receive processor 1438 performs the inverse of the processing performed by the transmit processor 1480 in the UE 1450. The data and control signals carried by the successfully decoded frames may then be provided to a data sink 1439 and the controller/processor, respectively. If some of the frames were unsuccessfully decoded by the receive processor, the controller/processor 1440 may also use an acknowledgement (ACK) and/or negative acknowledgement (NACK) protocol to support retransmission requests for those frames.

The controller/processors 1440 and 1490 may be used to direct the operation at the Node B 1410 and the UE 1450, respectively. For example, the controller/processors 1440 and 1490 may provide various functions including timing, peripheral interfaces, voltage regulation, power management, and other control functions. The computer readable media of memories 1442 and 1492 may store data and software for the Node B 1410 and the UE 1450, respectively. A scheduler/processor 1446 at the Node B 1410 may be used to allocate resources to the UEs and schedule downlink and/or uplink transmissions for the UEs.

Several aspects of a telecommunications system have been presented with reference to a W-CDMA system. As those skilled in the art will readily appreciate, various aspects described throughout this disclosure may be extended to other telecommunication systems, network architectures and communication standards.

By way of example, various aspects may be extended to other UMTS systems such as TD-SCDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

In accordance with various aspects of the disclosure, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: at least one a; at least one b; at least one c; at least one a and at least one b; at least one a and at least one c; at least one b and at least one c; and at least one a, at least one b and at least one c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

What is claimed is:

1. A method of providing a compressed mode transmission gap in wireless communications, comprising:
   receiving a downlink dedicated physical channel (DPCH) having a slot-format and a spreading factor during a first compression interval, wherein the downlink DPCH does not include a compressed-mode transmission gap during the first compression interval;
   receiving the downlink DPCH having the same slot-format and the same spreading factor during a second compression interval, wherein the slot-format includes no pilot signal and a TPC command is located at an end of each transmitted slot, wherein the downlink DPCH uses a 20 millisecond transmission in the second compression interval regardless of an uplink DPCH transmission mode;
   determining that the downlink DPCH includes a compressed-mode transmission gap during the second compression interval, wherein a set of slots of the downlink DPCH during the transmission gap are punctured;
   decoding the downlink DPCH for the second compression interval based on a set of remaining slots received during the second compression interval;
   estimating a downlink signal to interference ratio (SIR) based on the downlink DPCH received during the second compression interval, wherein estimating the downlink SIR includes estimating the downlink SIR based on a value of a TPC command received in a last slot of the transmission gap having a fixed value for the TPC command set by the slot-format;
   comparing the estimated downlink SIR to an adjusted SIR target, wherein the adjusted SIR target is increased based on the determination that the second compression interval includes a compressed mode transmission gap; and
   generating an uplink TPC command based on whether the estimated downlink SIR satisfies the adjusted SIR target.

2. The method of claim 1, wherein the adjusted SIR target is the same as a SIR target configured for a 10 millisecond DPCH transmission.

3. The method of claim 1, wherein receiving the downlink DPCH having the slot-format using the spreading factor during the first compression interval includes decoding the downlink DPCH based on slots in a first 10 ms frame of the first compression interval.

4. The method of claim 1, further comprising:
   decoding, successfully, the downlink DPCH for the second compression interval before the end of the second compression interval based on the received downlink DPCH slots; and
   transmitting an acknowledgment that the downlink DPCH was decoded successfully during the second compression interval.

5. The method of claim 1, further comprising receiving a compressed mode configuration, wherein the compressed mode configuration sets a transmission gap length and transmission gap distance such that a total number of slots in transmission gaps in two consecutive compression intervals is less than or equal to 15.

6. The method of claim 1, wherein the DPCH in the second compression interval is transmitted with a boosted power when an effective coding rate of the DPCH exceeds a threshold.

7. The method of claim 1, wherein estimating the downlink SIR based on the value of the TPC command received in the last slot of the transmission gap having a fixed value for the TPC command set by the slot-format includes estimating the downlink SIR based on the fixed value of the TPC command and the received TPC command.

8. An apparatus for providing a compressed mode transmission gap in wireless communications, comprising:
a receiver configured to:
receive a downlink dedicated physical channel (DPCH) having a slot-format and a spreading factor during a first compression interval, wherein the downlink DPCH does not include a compressed-mode transmission gap during the first compression interval, and
receive the downlink DPCH having the same slot-format and the same spreading factor during a second compression interval, wherein the slot-format includes no pilot signal and a TPC command is located at an end of each transmitted slot, wherein the downlink DPCH uses a 20 millisecond transmission in the second compression interval regardless of an uplink DPCH transmission mode;
a processor configured to determine that the downlink DPCH includes a compressed-mode transmission gap during the second compression interval, wherein a set of slots of the downlink DPCH during the transmission gap are punctured, wherein the processor is configured to:
estimate a downlink signal to interference ratio (SIR) based on the downlink DPCH received during the second compression interval, wherein estimating the downlink SIR includes estimating the downlink SIR based on a value of a TPC command received in a last slot of the transmission gap having a fixed value for the TPC command set by the slot-format;
compare the estimated downlink SIR to an adjusted SIR target, wherein the adjusted SIR target is increased based on the determination that the second compression interval includes a compressed mode transmission gap; and
generate an uplink TPC command based on whether the estimated downlink SIR satisfies the adjusted SIR target;
a decoder configured to decode the downlink DPCH for the second compression interval based on a set of remaining slots received during the second compression interval; and
a transmitter configured to generate an uplink TPC command based on whether the estimated downlink SIR satisfies the adjusted SIR target.

9. The apparatus of claim 8, wherein the adjusted SIR target is the same as a SIR target configured for a 10 millisecond DPCH transmission.

10. The apparatus of claim 8, wherein the decoder is configured to decode the downlink DPCH having the slot-format using the spreading factor during the first compression interval based on slots in a first 10 millisecond frame of the first compression interval.

11. The apparatus of claim 8, wherein the decoder is configured to decode the downlink DPCH for the second compression interval before the end of the second compression interval based on the received downlink DPCH slots, wherein the transmitter is configured to transmit an acknowledgment that the downlink DPCH was decoded successfully during the second compression interval.

12. The apparatus of claim 8, wherein a compressed mode configuration sets a transmission gap length and transmission gap distance such that a total number of slots in transmission gaps in two consecutive compression intervals is less than or equal to 15.

13. The apparatus of claim 8, wherein the DPCH in the second compression interval is transmitted with a boosted power when an effective coding rate of the DPCH exceeds a threshold.

14. The apparatus of claim 8, wherein the processor is configured to estimate the downlink SIR based on the fixed value of the TPC command and the received TPC command.

15. An apparatus for providing a compressed mode transmission gap in wireless communications, comprising:
means for receiving a downlink dedicated physical channel (DPCH) having a slot-foiniat and a spreading factor during a first compression interval, wherein the downlink DPCH does not include a compressed-mode transmission gap during the first compression interval;
means for receiving the downlink DPCH having the same slot-format and the same spreading factor during a second compression interval, wherein the slot-format includes no pilot signal and a TPC command is located at an end of each transmitted slot, wherein the downlink DPCH uses a 20 millisecond transmission in the second compression interval regardless of an uplink DPCH transmission mode;
means for determining that the downlink DPCH includes a compressed-mode transmission gap during the second compression interval, wherein a set of slots of the downlink DPCH during the transmission gap are punctured;
means for decoding the downlink DPCH for the second compression interval based on a set of remaining slots received during the second compression interval;
means for estimating a downlink signal to interference ratio (SIR) based on the downlink DPCH received during the second compression interval, wherein estimating the downlink SIR includes estimating the downlink SIR based on a value of a TPC command received in a last slot of the transmission gap having a fixed value for the TPC command set by the slot-format;
means for comparing the estimated downlink SIR to an adjusted SIR target, wherein the adjusted SIR target is increased based on the determination that the second compression interval includes a compressed mode transmission gap; and
means for generating an uplink TPC command based on whether the estimated downlink SIR satisfies the adjusted SIR target.

16. The apparatus of claim 15, wherein the adjusted SIR target is the same as a SIR target configured for a 10 millisecond DPCH transmission.

17. The apparatus of claim 15, wherein means for receiving the downlink DPCH during the first compression interval is configured to decode the downlink DPCH based on slots in a first 10 ms frame of the first compression interval.

18. The apparatus of claim 15, wherein the means for decoding are configured to decode the downlink DPCH for the second compression interval before the end of the second compression interval based on the received downlink DPCH slots, the apparatus further comprising means for transmitting an acknowledgment that the downlink DPCH was decoded successfully during the second compression interval.

19. The apparatus of claim 15, further comprising means for receiving a compressed mode configuration, wherein the compressed mode configuration sets a transmission gap length and transmission gap distance such that a total number of slots in transmission gaps in two consecutive compression intervals is less than or equal to 15.

20. The apparatus of claim 15, wherein estimating the downlink SIR based on the value of the TPC command received in the last slot of the transmission gap having a fixed value for the TPC command set by the slot-format includes estimating the downlink SIR based on the fixed value of the TPC command and the received TPC command.

21. A non-transitory computer-readable medium storing computer executable code comprising:
- code for receiving a downlink dedicated physical channel (DPCH) having a slot-format and a spreading factor during a first compression interval, wherein the downlink DPCH does not include a compressed-mode transmission gap during the first compression interval;
- code for receiving the downlink DPCH having the same slot-format and the same spreading factor during a second compression interval, wherein the slot-format includes no pilot signal and a TPC command is located at an end of each transmitted slot, wherein the downlink DPCH uses a 20 millisecond transmission in the second compression interval regardless of an uplink DPCH transmission mode;
- code for determining that the downlink DPCH includes a compressed-mode transmission gap during the second compression interval, wherein a set of slots of the downlink DPCH during the transmission gap are punctured;
- code for decoding the downlink DPCH for the second compression interval based on a set of remaining slots received during the second compression interval;
- code for estimating a downlink signal to interference ratio (SIR) based on the downlink DPCH received during the second compression interval, wherein estimating the downlink SIR includes estimating the downlink SIR based on a value of a TPC command received in a last slot of the transmission gap having a fixed value for the TPC command set by the slot-foimat;
- code for comparing the estimated downlink SIR to an adjusted SIR target, wherein the adjusted SIR target is increased based on the determination that the second compression interval includes a compressed mode transmission gap; and
- code for generating an uplink TPC command based on whether the estimated downlink SIR satisfies the adjusted SIR target.

22. The non-transitory computer-readable medium of claim 21, further comprising code for receiving a compressed mode configuration, wherein the compressed mode configuration sets a transmission gap length and transmission gap distance such that a total number of slots in transmission gaps in two consecutive compression intervals is less than or equal to 15.

23. The non-transitory computer-readable medium of claim 21, wherein the code for estimating the downlink SIR based on the value of the TPC command received in the last slot of the transmission gap having a fixed value for the TPC command set by the slot-format includes code for estimating the downlink SIR based on the fixed value of the TPC command and the received TPC command.

* * * * *